April 3, 1956   J. H. GRUVER   2,740,354
PRINTING MACHINES
Filed July 22, 1950   22 Sheets-Sheet 5

Inventor
John H. Gruver
BY Wallace and Cannon
Attorneys

April 3, 1956  J. H. GRUVER  2,740,354
PRINTING MACHINES
Filed July 22, 1950  22 Sheets-Sheet 6
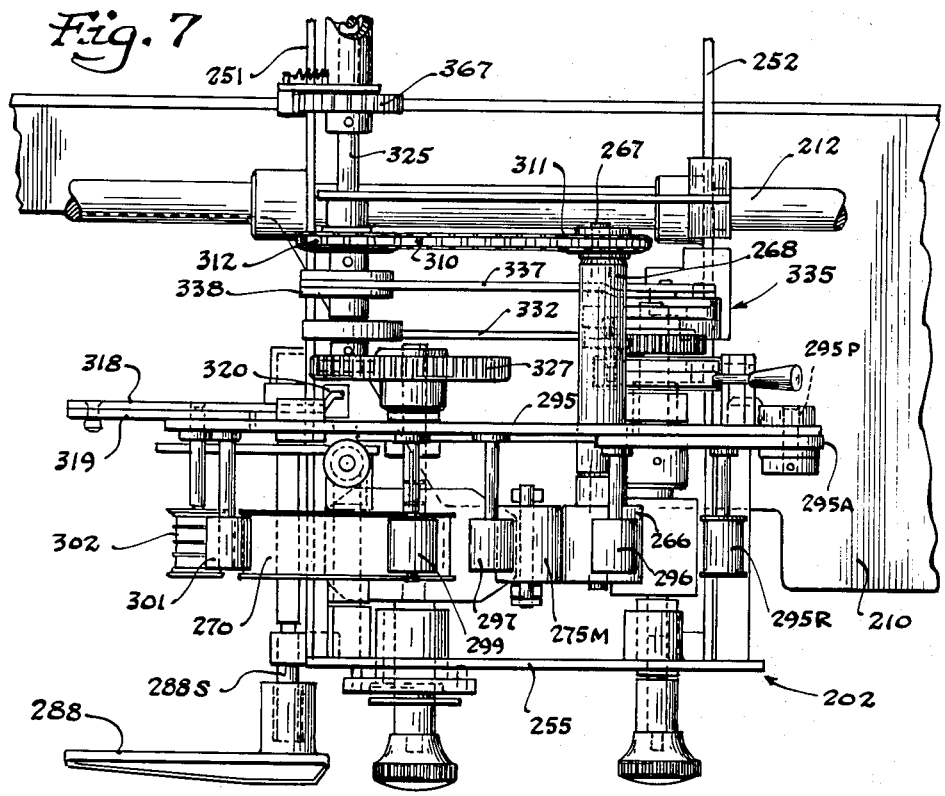
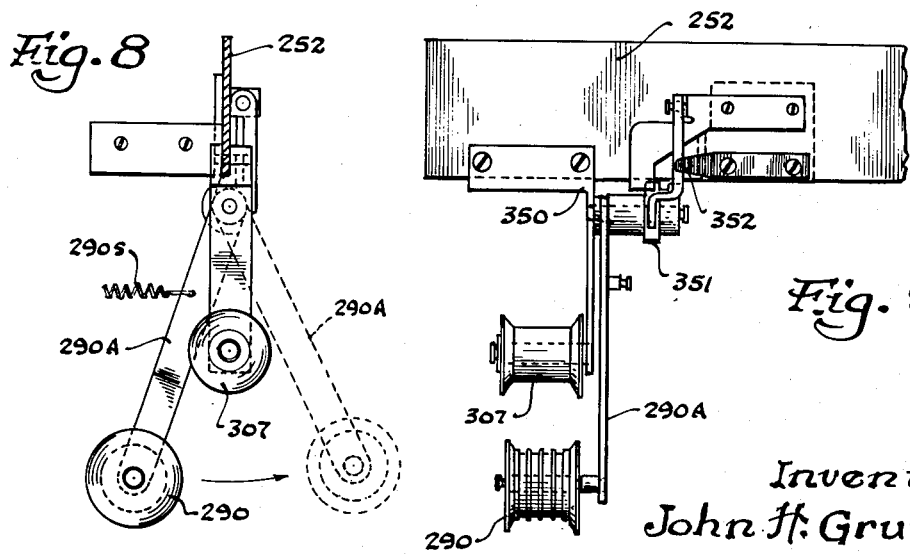
Inventor
John H. Gruver
By Wallace and Cannon
Attorneys

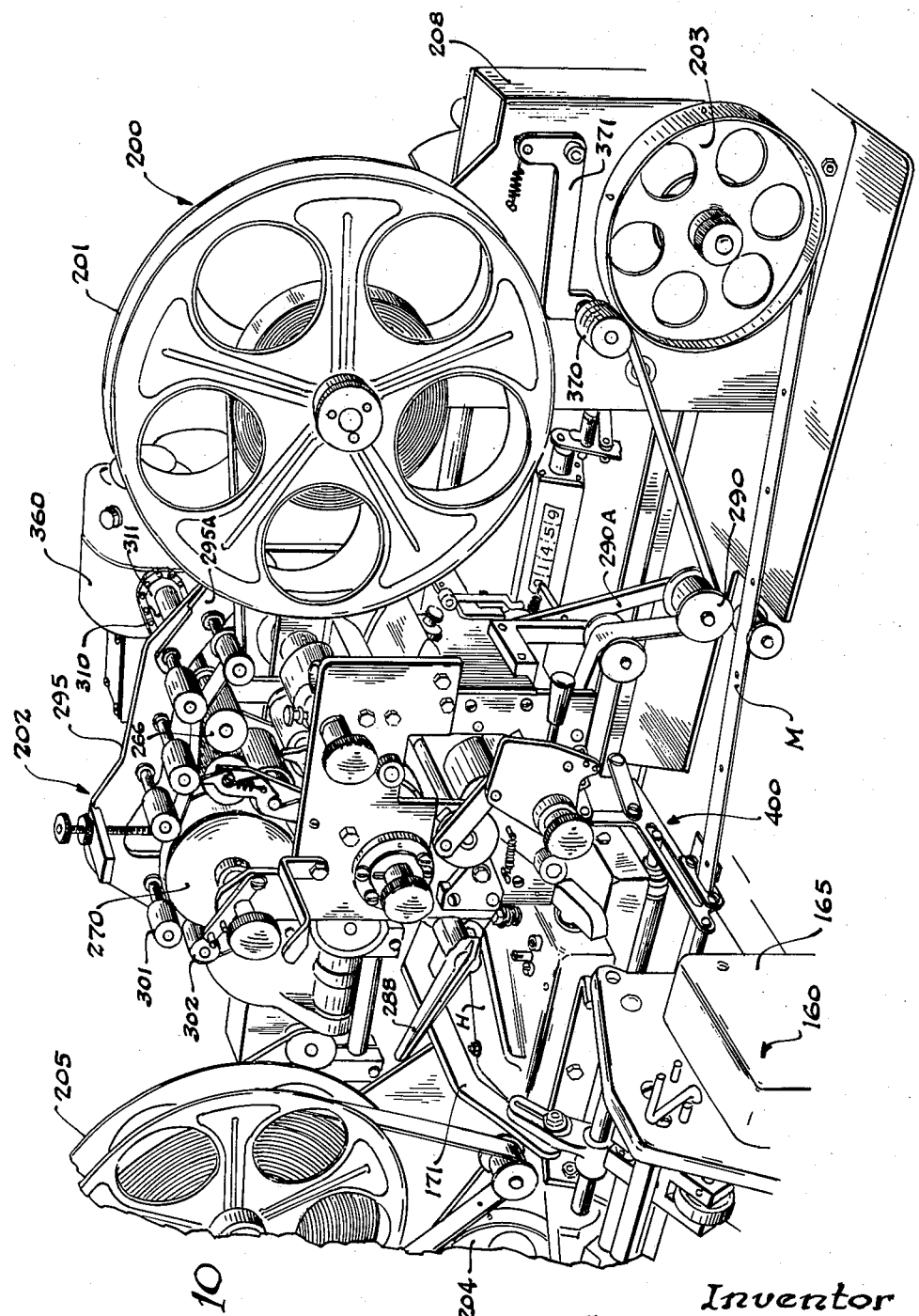

April 3, 1956     J. H. GRUVER     2,740,354
PRINTING MACHINES

Filed July 22, 1950     22 Sheets-Sheet 8

Inventor
John H. Gruver
By Wallace and Cannon
Attorneys

April 3, 1956 J. H. GRUVER 2,740,354
PRINTING MACHINES
Filed July 22, 1950 22 Sheets-Sheet 9

Inventor
John H. Gruver
By Wallace and Cannon
Attorneys

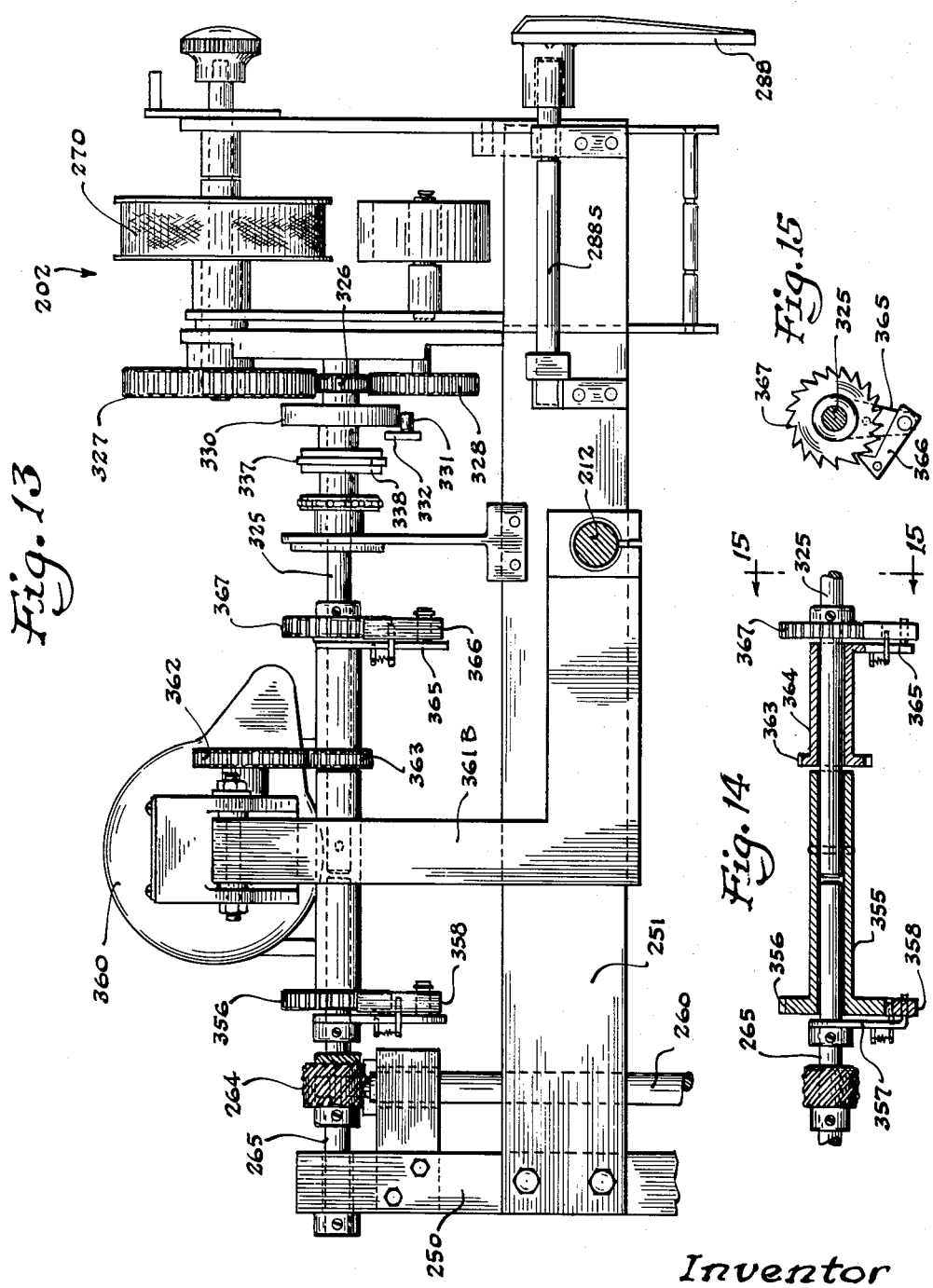

April 3, 1956  J. H. GRUVER  2,740,354
PRINTING MACHINES

Filed July 22, 1950  22 Sheets-Sheet 11

Inventor
John H. Gruver
By Wallace and Cannon
Attorneys

April 3, 1956    J. H. GRUVER    2,740,354
PRINTING MACHINES

Filed July 22, 1950    22 Sheets-Sheet 12

Inventor
John H. Gruver
By Wallace and Cannon
Attorneys

April 3, 1956   J. H. GRUVER   2,740,354
PRINTING MACHINES
Filed July 22, 1950   22 Sheets-Sheet 13

Inventor
John H. Gruver
By Wallace and Cannon
Attorneys

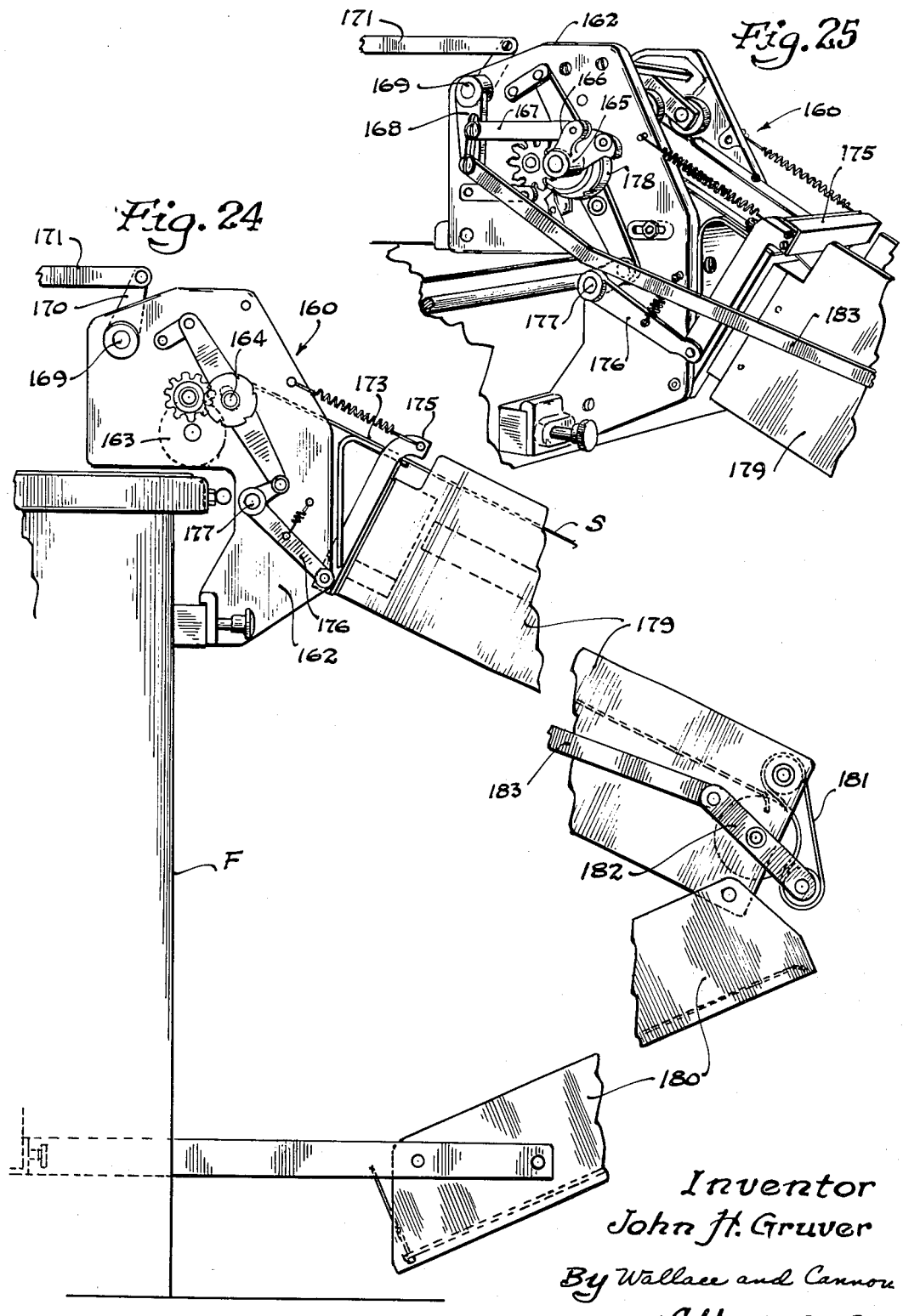

April 3, 1956  J. H. GRUVER  2,740,354
PRINTING MACHINES
Filed July 22, 1950  22 Sheets-Sheet 15

Inventor
John H. Gruver
By Wallace and Cannon
Attorneys

April 3, 1956   J. H. GRUVER   2,740,354
PRINTING MACHINES
Filed July 22, 1950   22 Sheets-Sheet 16

Inventor
John H. Gruver
By Wallace and Cannon
Attorneys

April 3, 1956 J. H. GRUVER 2,740,354
PRINTING MACHINES
Filed July 22, 1950 22 Sheets-Sheet 17
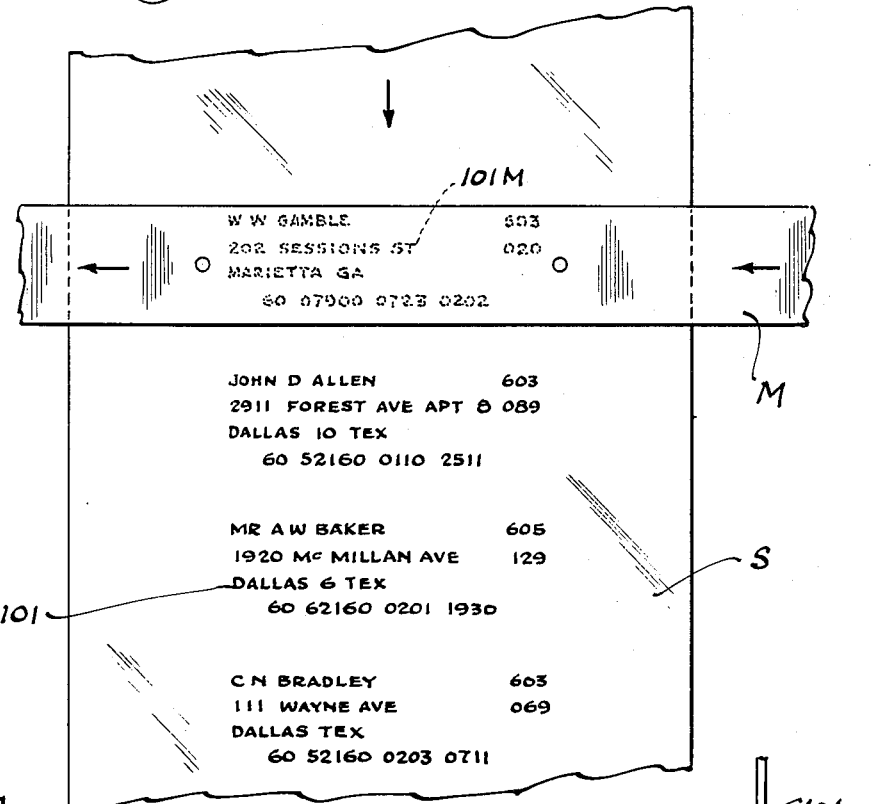
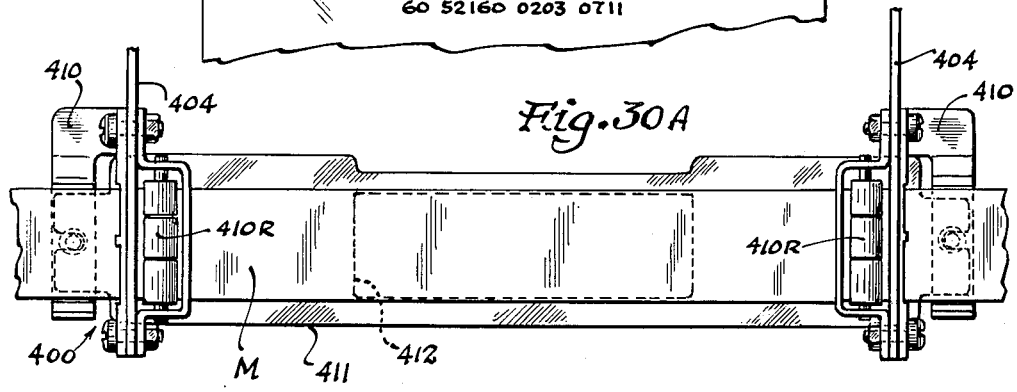
Inventor
John H. Gruver
By Wallace and Cannon
Attorneys April 3, 1956     J. H. GRUVER     2,740,354
PRINTING MACHINES Filed July 22, 1950     22 Sheets-Sheet 18

Inventor
John H. Gruver
By Wallace and Cannon
Attorneys

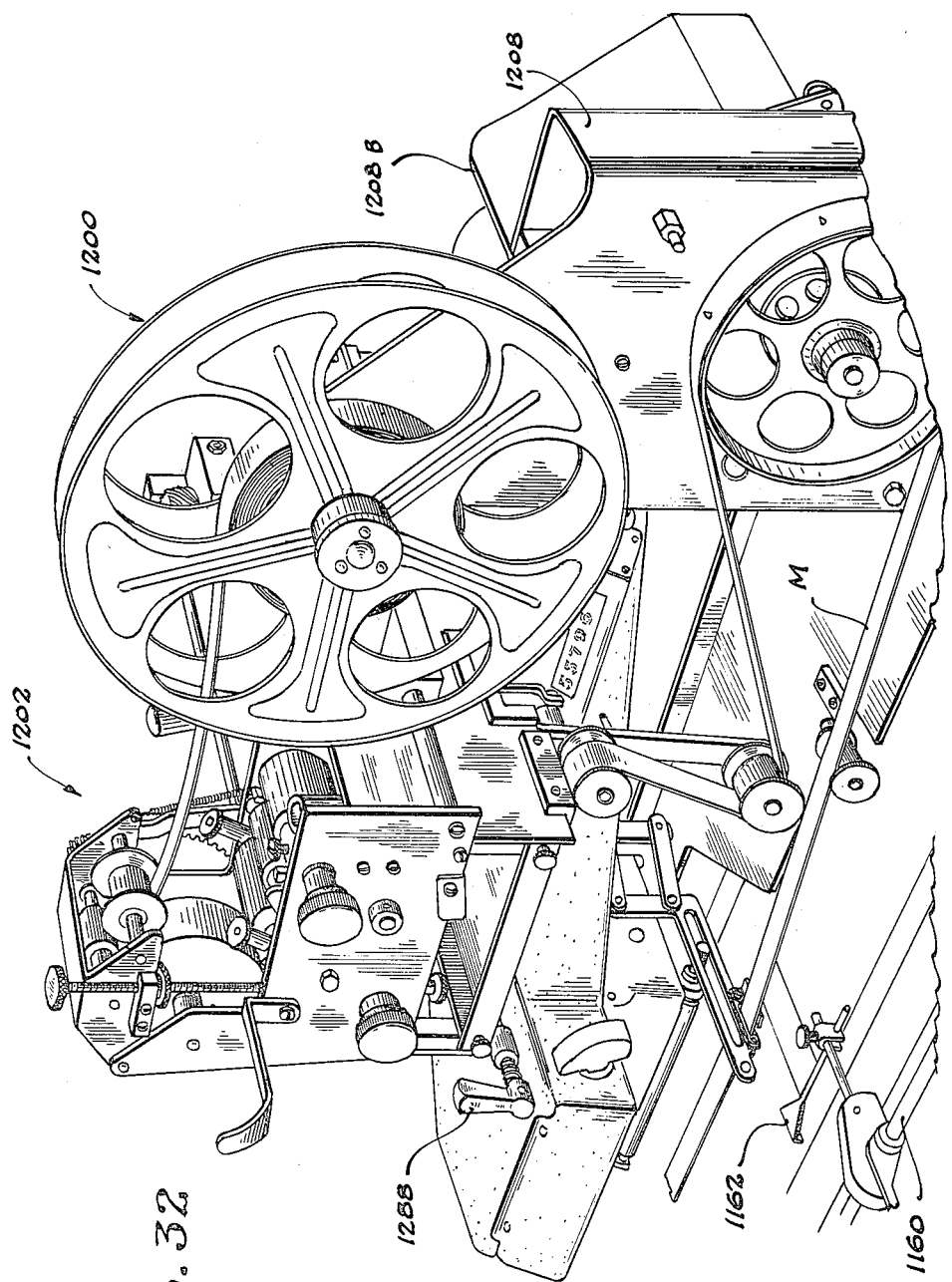

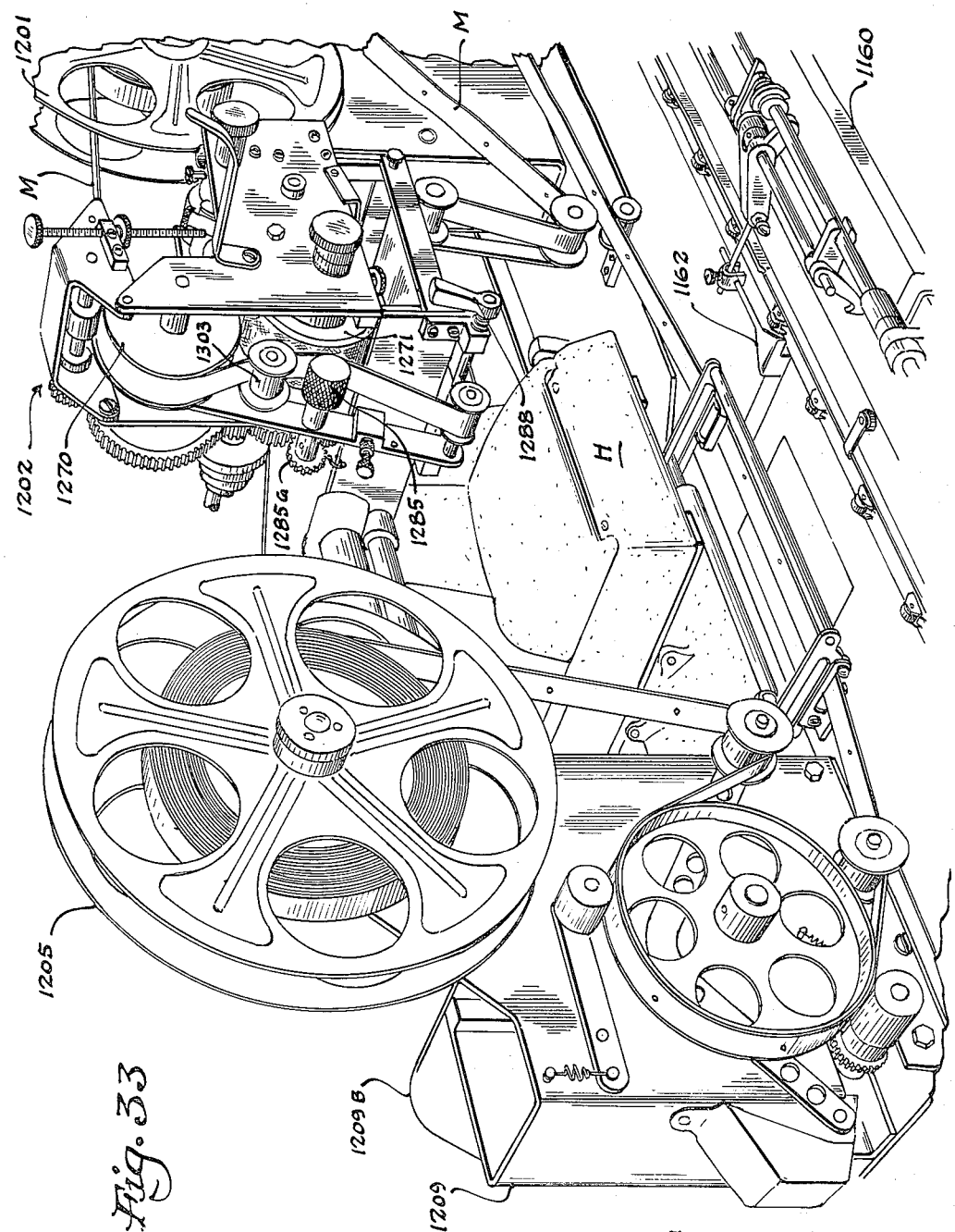

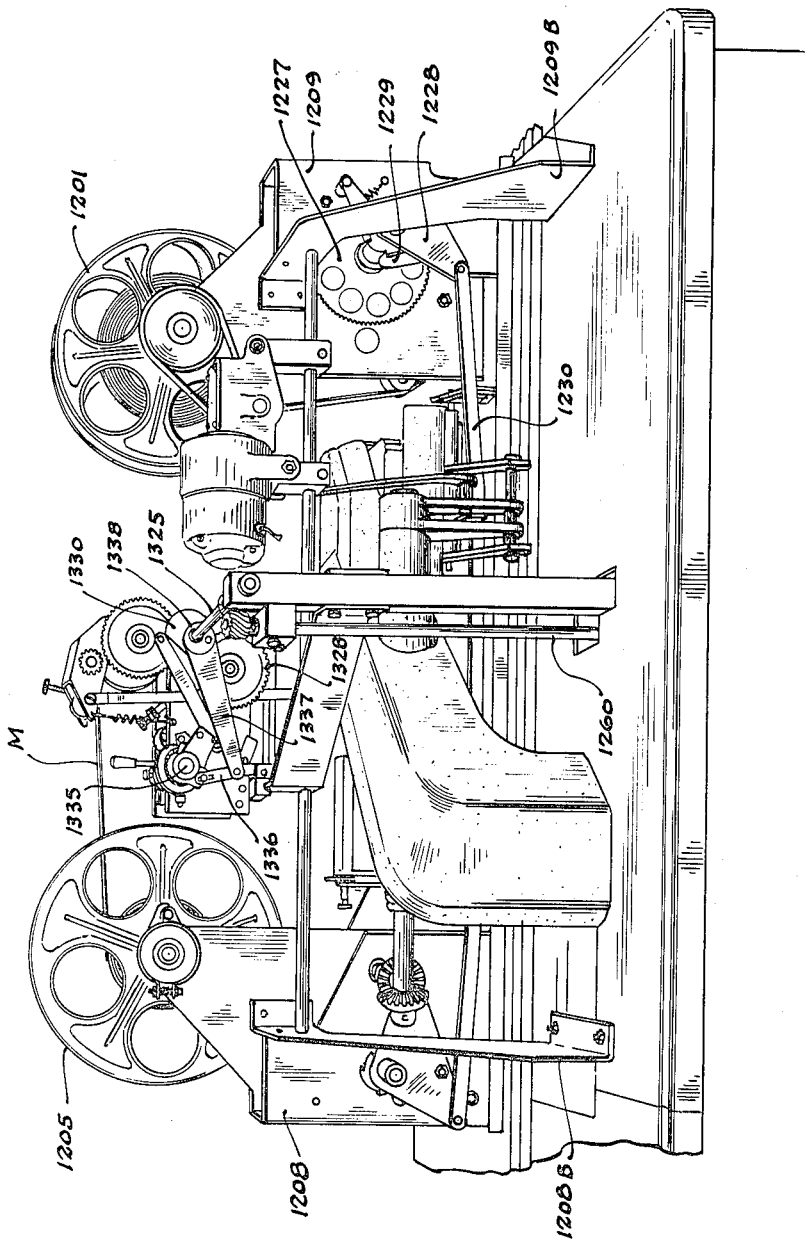

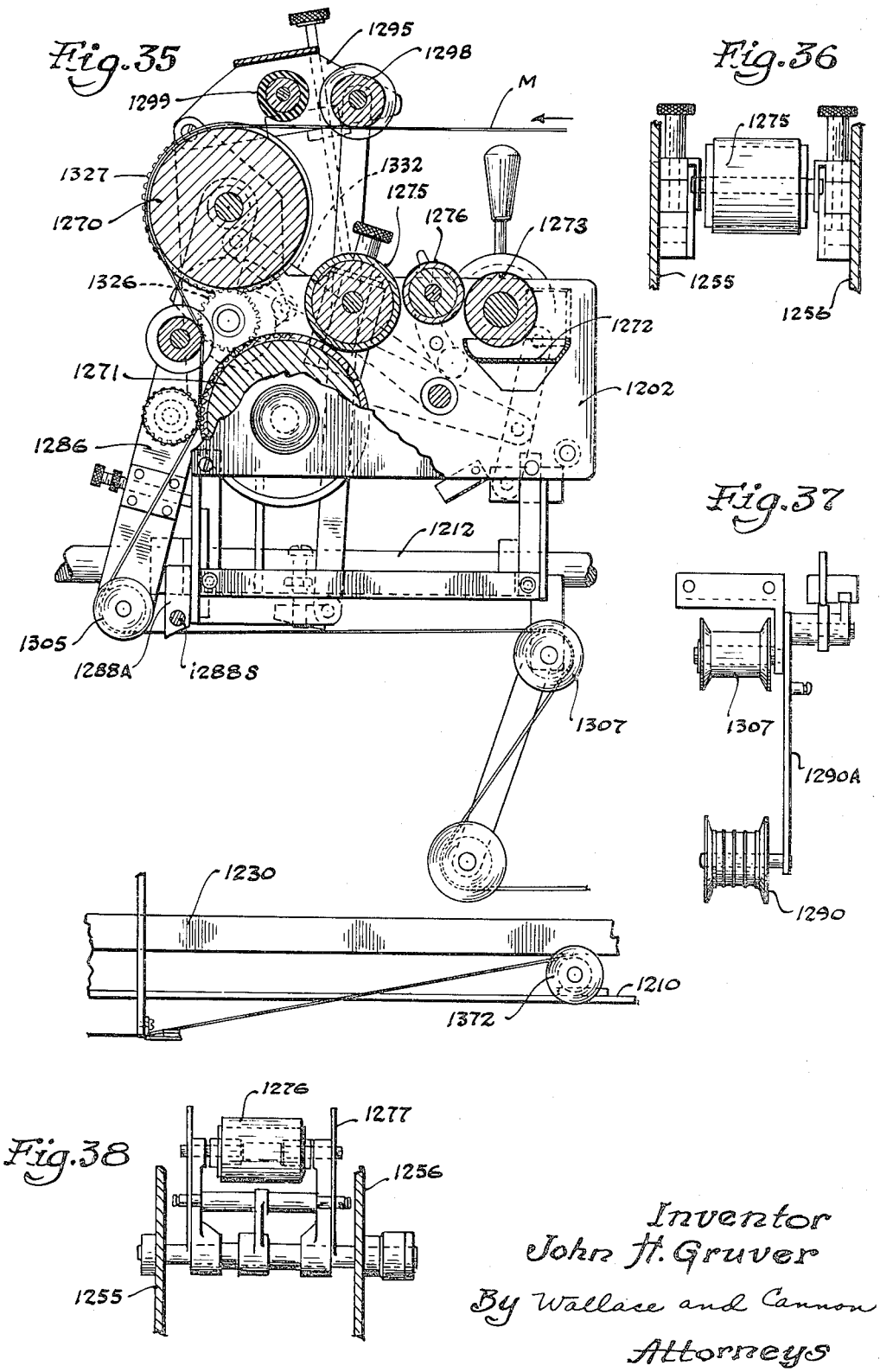

2,740,354

PRINTING MACHINES

John H. Gruver, Cleveland Heights, Ohio, assignor to Addressograph-Multigraph Corporation, Wilmington, Del., a corporation of Delaware Application July 22, 1950, Serial No. 175,370

23 Claims. (Cl. 101—134.5)

This invention relates to printing machines and particularly to printing machines adapted to produce a series of printed impressions in successive operations of the machine.

As particularly applied to addressing and mailing problems, the production of printed addresses on a large number of mailing pieces is, in most instances, governed by and made from a master list which is made up of individual address-bearing elements such as cards or embossed printing devices, and since lists of this character must be the subject of continuous revision and upkeep so as to be maintained in an accurate and current condition, these lists are available for use only at a central office or the like and only during limited periods. It is an important object, therefore, of the present invention, to expand the usefulness of such master lists and the like, particularly as such lists are employed in the circulation and mailing departments of the publishers of extensively distributed magazines and the like, and an object related to the foregoing is to enable this to be accomplished through the production and use of secondary reproduceable lists which may, after production thereof from the master file, be utilized independently of the availability of the master list or file. Such secondary reproduceable lists may be made through the use of the facsimile system described in Thompson Patent No. 2,510,200, patented June 6, 1950, where the master list is maintained on cards or the like, or may be made by printing from the embossed printing devices when the master list is kept on such printing devices.

A further and more specific object of the present invention is to enable reproduceable lists of addresses and the like to be utilized in an elongated strip-like form for producing a series of printed impressions that may be made either on mailing strips or on individual mailing pieces, and a related object is to enable such strip-like printing members to be conveniently and efficiently handled in the production of printed impressions therefrom. More specifically, it is an object of the present invention to afford a printing machine through which sheets upon which impressions are to be made may be fed, and to enable such impressions to be made on the sheets from a strip-like master list which carries the printed text matter thereon in a readily reproduceable form.

Such reproduction is under the present invention accomplished through the use of either a spirit transfer process of reproduction or through the use of the lithographic process, and it is a further object of the present invention to enable master strips prepared in accordance with either of the aforesaid processes to be continuously and effectually treated as they pass through the machine so as to condition the same for the production of printed impressions in such machine. Further and related objects of the present invention are to enable the printing apparatus for such a strip to be readily controlled and to enable the treating apparatus to be disabled during periods when the printing machine is stopped.

In the production of printed impressions under either of the aforesaid processes, the neatness and density of the impressions is influenced greatly by the amount of moisture that is applied to the master in the course of the conditioning operations, and a further object of the present invention is to enable the amount of moisture that is thus applied to the master to be readily and accurately controlled. More specifically, it is an object of the present invention to apply the moisture to the master in such a machine through the use of a driven moisture applying roll, and a further object is to apply the moisture by driving such moisture applying roll in a direction counter to the direction of movement of the master, thereby to enable a limited and controlled amount of moisture to effectually condition the master for the printing operation.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention, and the purview of the appended claims.

In the drawings:

Fig. 2A is an enlarged elevational view of a portion of the conditioning unit;

Fig. 7 is a plan view of the conditioning unit;

Figs. 8 and 9 are views illustrating portions of the strip guiding mechanism;

Fig. 10 is a fragmentary perspective view showing the mechanism as viewed at an angle from the right of the machine;

Fig. 13 is a fragmentary vertical sectional view showing a portion of the drive mechanism for the conditioning unit;

Fig. 14 is a sectional view showing details of the structure shown in Fig. 13;

Fig. 15 is a view taken from the line 15—15 of Fig. 14;

Fig. 24 is a side elevational view of the reversing stacker mechanism;

Fig. 25 is a fragmentary perspective view of a portion of the structure shown in Fig. 24;

Fig. 30 is a schematic view illustrating the relationship of the master strip and a mailing strip upon which impressions are made from the master strip;

Fig. 30A shows further details of the strip supporting mechanism that is located at the platen;

Fig. 32 is a perspective of the right-hand portion of the front of the mechanism;

Fig. 33 is a perspective taken from the left showing the forward portions of the machine;

Fig. 34 is a view showing the rear of the machine illustrated in Fig. 31;

Fig. 35 is a vertical sectional view through the conditioning unit of the machine shown in Fig. 31;

Fig. 36 is a fragmentary view showing details of the mounting for the oscillating roll;

Fig. 37 is a view illustrating the mounting of the diablo shown in Fig. 35; and

Fig. 38 is a fragmentary view showing details of mounting of the ductor roll of Fig. 35.

For purposes of disclosure, the invention is herein illustrated in Figs. 1 to 30 of the drawings as embodied in a printing machine 100 that is adapted to produce printed impressions 101, Fig. 30, on a sheet S from images 101M formed at spaced points along a continuous master M that is in strip form and which is fed with a step-by-step movement past a printing station in the machine. The printing machine 100 is in a basic sense constructed in the general way disclosed in the patents of Carl J. Hueber, Nos. 2,359,849 and 2,359,850, patented October 10, 1944, and the strip-like master M is fed to the printing station and is conditioned for printing by a feeding and conditioning unit 200 that is mounted on and forms a part of the printing machine 100.

Figure 16:
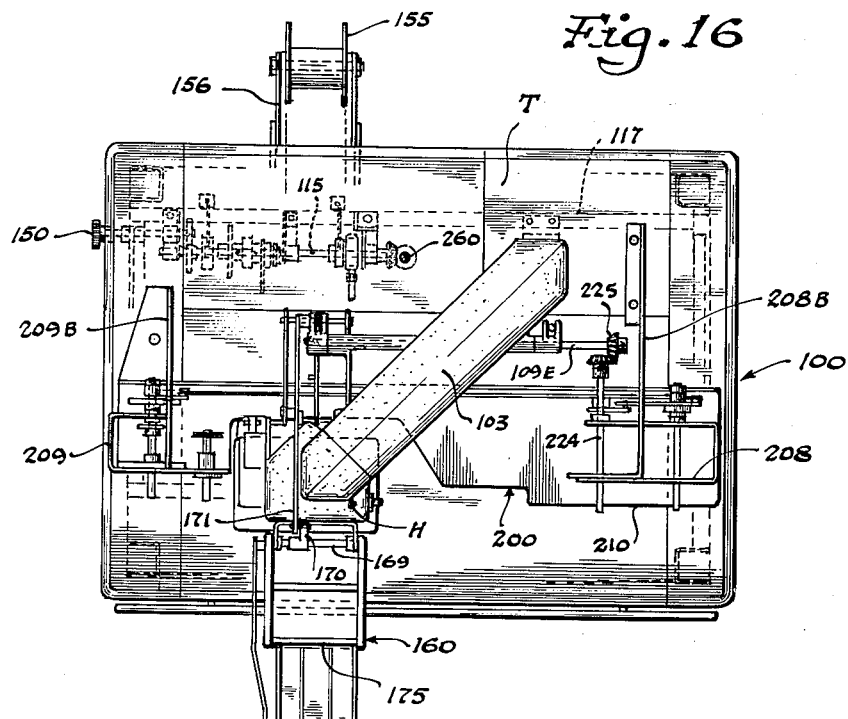
Fig. 16 is a plan view of the machine with certain portions of the mechanism removed so as to illustrate the relationship of the strip handling and conditioning unit to the main frame of the machine.
Figure 17:
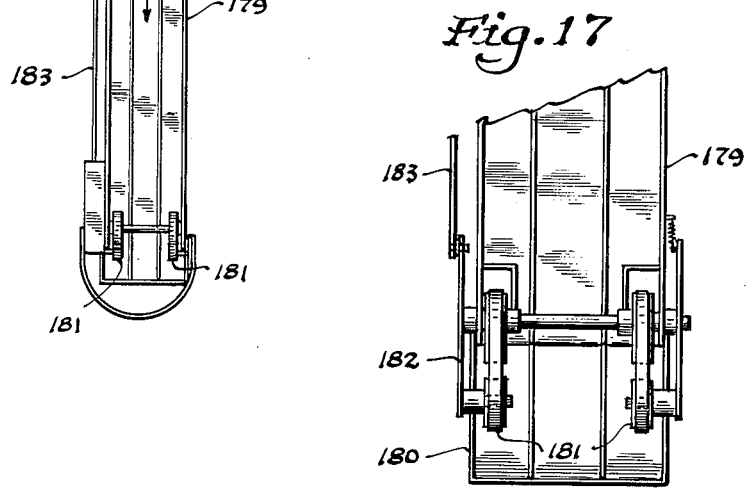
Fig. 17 is a view illustrating details of the reversing stacker.

As disclosed in the aforesaid Hueber patents, the printing machine 100 embodies a desk-like frame F having a table top T, and, as best shown in Fig. 16 of the drawings, the machine has a printing arm 103 that projects upwardly from the table top T relatively close to the rear right-hand corner of the table top, and this arm 103 projects forwardly and to the left across the table top T and in an upwardly spaced relation, and the arm terminates in a forward head H that serves in part to define a printing station at which the impressions 101 are made on the sheet S from the master strip M.

Figure 1:
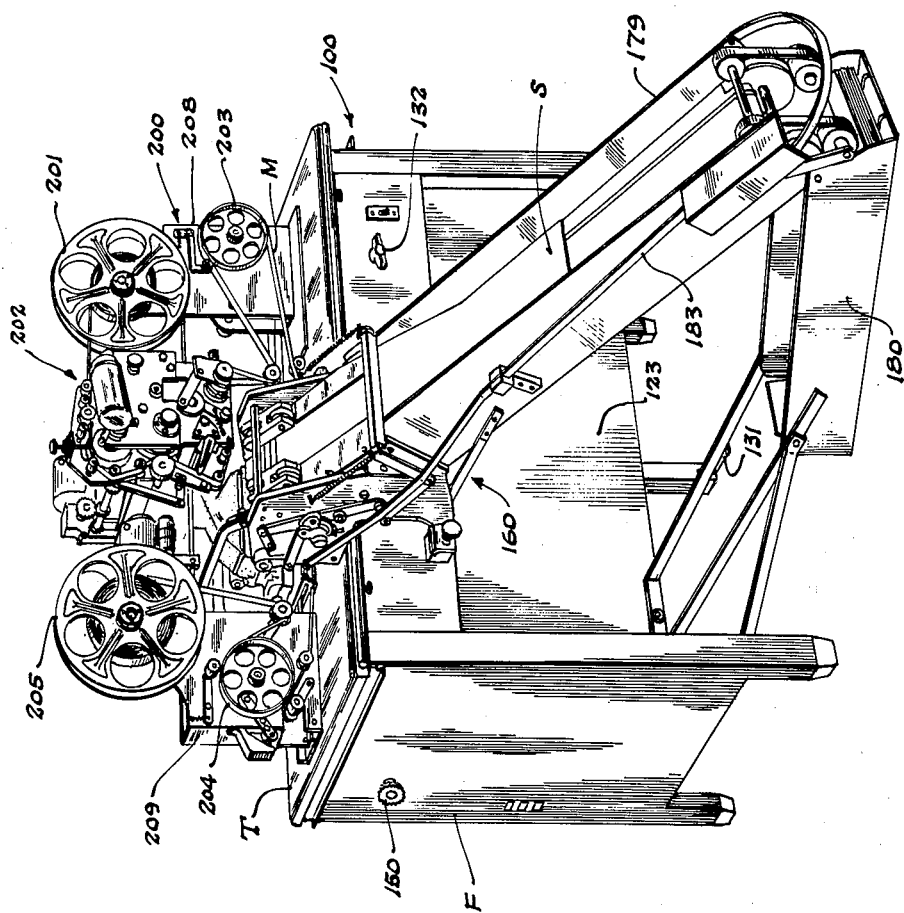
Fig. 1 is a perspective view of a printing machine embodying the features of the invention.
Figure 26:
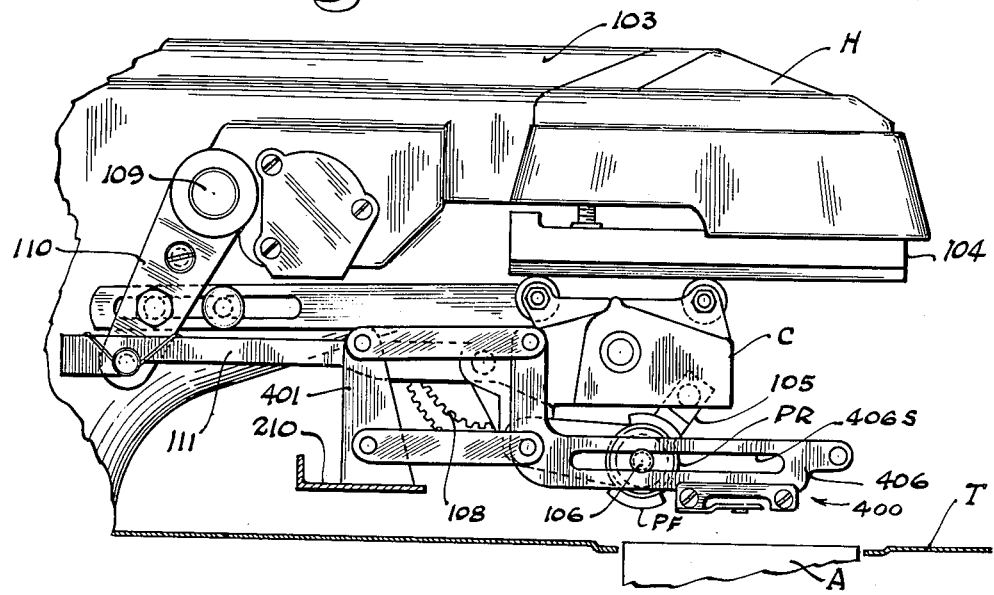
Fig. 26 is a side elevational view of the platen mechanism with the platen roller in its elevated or inactive position.
Figure 27:
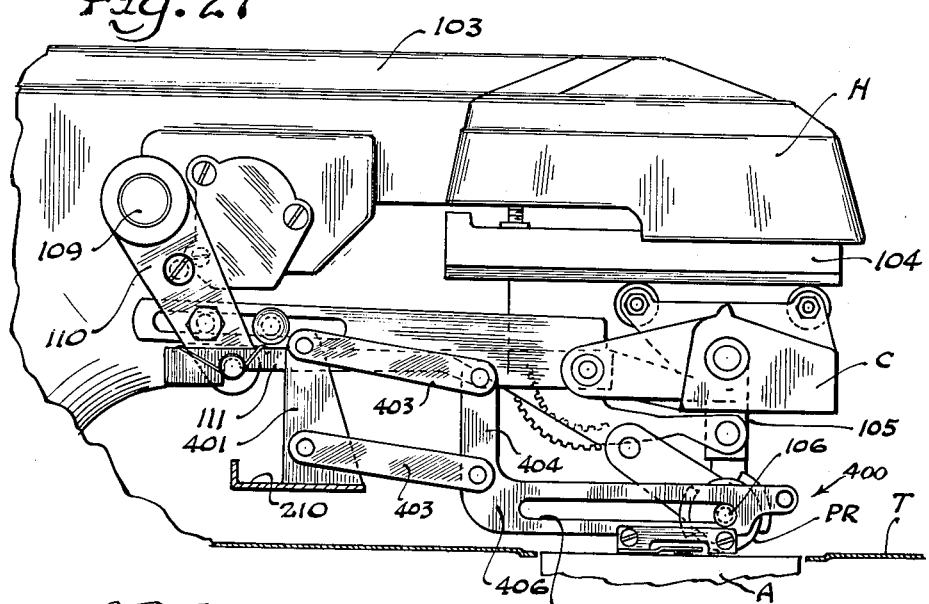
Fig. 27 is a view similar to Fig. 26 and showing the platen roller in its forward and lowered position which it attains just prior to the performance of the actual printing operation.
Figure 27A:
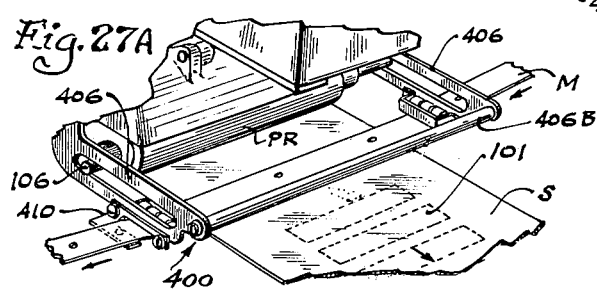
Fig. 27A is a fragmentary perspective view of the strip guiding mechanism associated with the platen.
Figure 28:
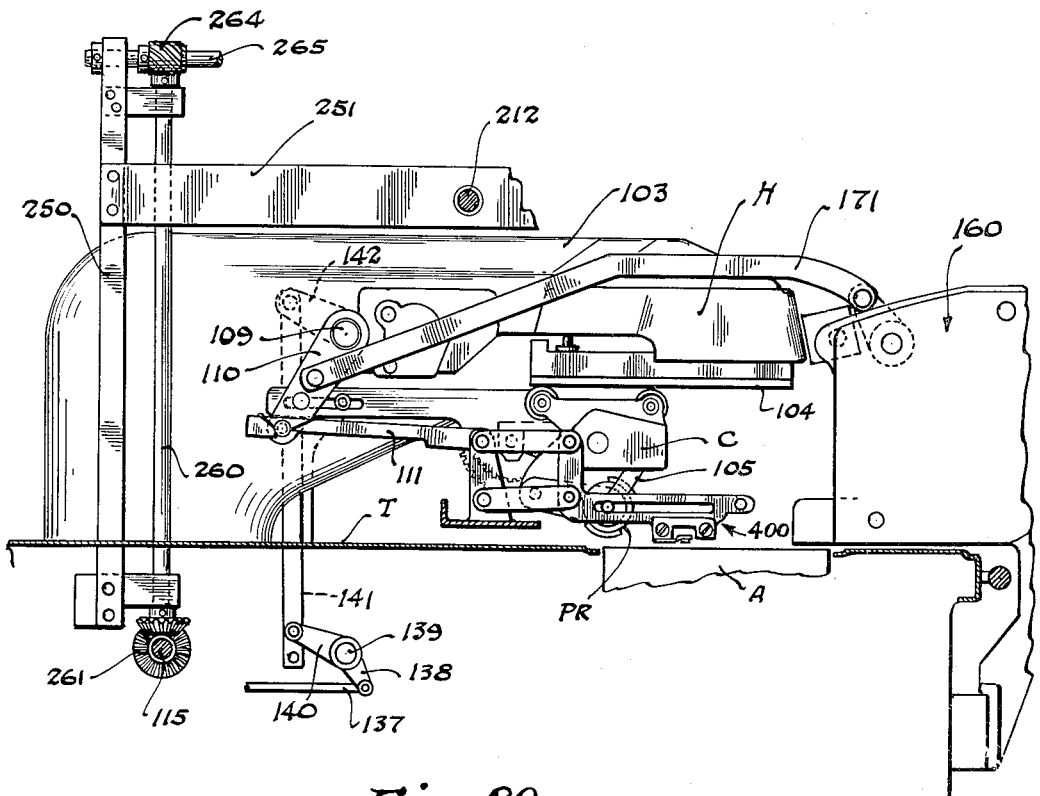
Fig. 28 is a view similar to Fig. 26 but showing additional portions of the mechanism.
Figure 29:
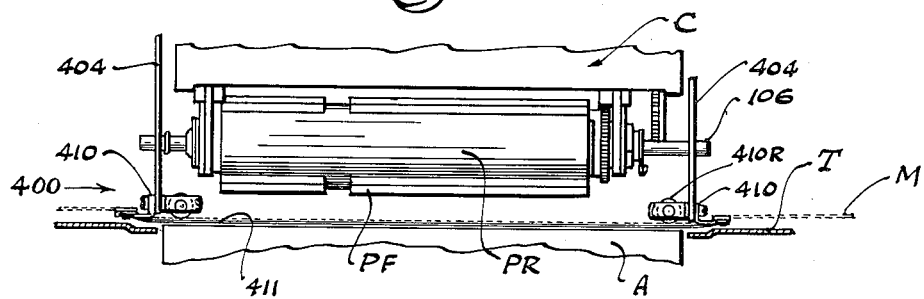
Fig. 29 is a fragmentary front elevational view of the platen roller and the related mechanisms.

As will be hereinafter described in greater detail, the unit 200 feeds the master strip M from a supply reel 201 past or through a conditioning unit 202, about a feeding pin wheel 203 and parallel to the front edge of the frame over the printing station to a feeding pin wheel 204 and thence to a collecting reel 205, as shown in Fig. 1; and the sheet S is advanced into position at the printing station with a portion of the master strip M in an overlying relationship, and the master strip M is then pressed downwardly against the sheet S so as to effect the desired printing operation. This downward pressing of the master strip M is accomplished through the use of the roller platen mechanism that is illustrated in both of the aforesaid Hueber patents and which is described in considerable detail in the Hueber Patent No. 2,359,849. Thus, as shown in Figs. 26 to 29, the head H is disposed directly over an anvil A that is located beneath the table top T, as described in the aforesaid Hueber patents, and in the lower face of the head H, an adjustable track plate 104 is provided which supports a reciprocable carriage C that is adapted to be moved back and forth in a front to rear direction by means that are disclosed in the aforesaid Hueber patents. The carriage C has a platen roller PR mounted thereon by means including toggles 105 and a mounting shaft 106 so that the platen roller PR may be shifted from an upper or retracted position that is shown in Fig. 26 of the drawings and a lower or printing position that is shown in Fig. 27 of the drawings. The platen roller PR has one or more resilient printing faces PF, as described in the aforesaid Hueber patents, and when the platen roller is in its lower position, as shown in Fig. 27, it may be rolled in a rearward direction to apply printing pressure, which in the present instance is applied to the upper face of the master strip M in an area in which an image 101M is located, as will be evident in Fig. 30 of the drawings. The raising and lowering of the platen roller PR is accomplished as an incident to the reciprocation of the carriage C, as described in the aforesaid Hueber patents, and the rotative positioning and movements of the platen roller PR are controlled by means including gearing 108, which is also described in particular in the aforesaid Hueber Patent No. 2,359,849.

The reciprocating movements are imparted to the platen carriage C by means including a rock shaft 109 mounted in the arm 103 horizontally and in a right-angular relationship with respect to the path of reciprocation of the carriage, and this rock shaft 109 has arms 110 extended downwardly therefrom and connected by means including forwardly extending links 111 to the carriage C.

The operating mechanisms of the printing machine 100 are driven in a large measure from actuating mechanisms that are in their major details like the actuating mechanisms described in the aforesaid Hueber patents, but in a broad sense, it should be noted that in the present machine the printing device advancing mechanisms and the related printing device supply magazine have been eliminated, so that the corresponding clutches and control mechanisms for the printing device advancing means of the aforesaid Hueber patents have been eliminated in the present machine. Thus, as shown in Figs. 18 to 23, the present machine includes a main drive shaft 115 that is supported by brackets 116 from a mounting rail 117 that forms a part of the enclosed frame structure of the machine, as disclosed in the aforesaid Hueber patents, and this drive shaft 115 is adapted to be driven through a main one-revolution control clutch 118 from a constantly driven sprocket 120. The sprocket 120 is loosely or rotatably mounted on the shaft 115, and has a hub 120' projecting into and forming a part of the clutch 118, such hub 120' constituting the driving element of the clutch 118. In the present instance, the sprocket 120 is driven through suitable reducing connections from a drive motor 122 that is mounted on the rear side of a depending skirt member 123 of the frame F. The drive shaft of the motor 122 is connected by a belt 124 to a relatively large pulley 125, and this pulley is connected through an overloaded release mechanism 126 to a relatively small sprocket 127 that is mounted adjacent to and on the same axis as the pulley 125. The sprocket 127 is in turn connected by a chain 128 to the sprocket 120 so that the driven element of the clutch 118 is constantly operated at the proper speed.

The clutch 118 embodies a stop lever 118' which normally tends to disengage the clutch 118, and this stop lever 118' is adapted, through the medium of a rock shaft 130, to be shifted to its ineffective or released position by means of a foot control lever 131, Fig. 1, this arrangement being described in detail in the aforesaid Hueber patents, and when the stop lever 118' is thus released, the main drive shaft 115 is constantly driven. In the present instance, the stop lever 118' may also be shifted to and held in its released position by a manually controlled lever 132 that is disposed on the forward face of the machine frame F, as will be evident in Fig. 1 of the drawings.

The platen mechanism of the machine is driven from the main shaft 115 through the medium of a platen clutch 135, the driven element of which is afforded by a hub 135H that is fixed on the shaft 115. The driven element of the clutch is in the form of a hub-shaped member 135C, and has an eccentric 136 fixed thereto. This eccentric has the strap thereof connected by means of a connecting rod 137 to an arm 138 that is fixed on a rock shaft 139, Fig. 28, this structure being shown in the aforesaid Hueber patents. The rock shaft 139 has another arm 140 fixed thereon, and this arm is connected by a vertically extending link 141 and an arm 142 to the rock shaft 109, so that whenever the platen clutch 135 is engaged, the rock shaft 109 will be operated through one rocking movement back and forth for each revolution of the driven member of the clutch 135. The clutch 135 has a stop member 135' that is normally engaged, and this stop member is arranged so that it is shifted to its raised or released position directly by the operation of the control element 131 or 132, and when so actuated, the stop lever 135' rocks the shaft 130 so that the stop lever 118' is released. This is accomplished by means including an operating arm 145 fixed to the rock shaft 130 and arranged to be engaged by a stop screw 146 that is mounted on the rear end of the stop lever 135'.

The left-hand end of the main drive shaft 115 is arranged in the manner described in the aforesaid Hueber patent No. 2,359,850 for driving or controlling a sheet feeder or the like, and this means includes a one-revolution control clutch 147 that is engaged each time the platen mechanism is operated. This clutch is arranged through gearing 148 to drive a shaft 149 which has an operating gear 150 disposed in an exposed relationship on the left-hand end of the frame F, as shown in Fig. 1 of the drawings.

In the embodiment of the invention illustrated in Figs. 1 to 30 of the drawings, the sheet S is advanced into and then out of printing position by movement forwardly along the table top T or, in other words, transversely with respect to the line of advancing movement of the master strip M. The sheet S is in this instance afforded in the form of a web mounted on a supply reel 155 that is supported above and near the rear edge of the table top T by means including a bracket 156, Fig. 16. The web that is supported on the supply reel 155 is extended forwardly along the table top and past printing position, and near the forward edge of the table top is associated with a reversing stacker mechanism 160 which not only imparts forward advancing movements to the web, but also is operative to sever the web into sheets S of predetermined length which bear a predetermined number of printed impressions 101. The reversing stacker mechanism 160 embodies a main frame 162, Figs. 24 and 25, that is mounted on the forward portion of the machine frame F, and within this mechanism 160, feeding or advancing means are afforded for advancing the web a predetermined distance each time the platen roller PR is operated through a printing cycle. The reversing stacker mechanism 160 does not in itself form a part of the present invention and, therefore, will be described only in a general way. Thus, the reversing stacker mechanism includes feed rolls 163 which are effective to impart the desired advancing movements to the sheet or web, and one of these feed rolls has an operating shaft 164. This operating shaft 164 has a first ratchet mechanism associated therewith and housed within a cover 165C at the right-hand side of the unit, so that upon rocking movement of the shaft 164, the feed rollers 163 are actuated through an indexing or advancing movement. On the left-hand side of the unit, another ratchet mechanism 165 is provided, and this mechanism includes a rocking arm 166 fixed on the shaft 164. This arm 166 is connected by a link 167 to a rocking lever 168 which is fixed on a rock shaft 169 that is mounted in the frame 162 near the upper rear corner thereof. A lever arm 170 on the rock shaft 169 is connected by means of a link 171 to one of the operating arms 110 of the platen driving mechanism, so that each time the carriage C of the platen mechanism is being moved in a forward direction, the shaft 164 is rocked in a forward direction, and it is in such forward movement of the pawl mechanism 165 that the sheet S is advanced. The sheet S is advanced forwardly from the upper one of the feed rolls 163 across a guide member 173 that forms one element of a sheet severing or cutoff mechanism, the other element of which is afforded by a vertically reciprocable knife structure 175. This knife structure has its lower ends connected to a pair of operating arms 176 that are mounted on a rock shaft 177, and this rock shaft is arranged to be actuated by means including a cam 178 mounted on the shaft 164 and advanced in a step-by-step manner by the ratchet and pawl structure 165, so that the continuous web is severed into predetermined lengths or individual sheets. The web that is to form these individual sheets is fed forwardly and downwardly through a guide chute 179, and at the lower end of this guide chute, the individual sheets are fed in a reverse direction or, in other words, in a rearward and downward direction, into a collecting hopper 180, wherein the sheets are stacked in a sequential relationship which corresponds with the sequence in which successive impressions 111 were made. At the lower end of the guide channel 179, a reversing feed belt structure 181 is provided that is driven by a ratchet mechanism 182 and a drive link 183, which link is extended upwardly along the guide channel 179 and is connected to the rocking arm 168, as will be evident in Fig. 25 of the drawings. The arrangement or spacing is so related to the feeding and severing mechanism of the unit that the leading end of the web is engaged by the belt structure 181 just prior to being severed to form an individual sheet.

The feeding and conditioning unit 200 for the master strip M is best shown in Figs. 1 to 12 of the drawings, and this unit comprises a frame structure having upstanding hollow column structures 208 and 209 at its opposite ends and arranged to be disposed adjacent to the opposite ends of the machine frame F, these column structures being disposed somewhat rearwardly of the position of the printing station. The two column structures 208 and 209 are mounted on a base plate 210 that is supported in an upwardly spaced relation with respect to the upper face of the table top T, as will be described hereinafter. Each of the column structures 208 and 209 is formed from relatively heavy sheet metal that is bent into a generally U-shaped form as viewed in plan, as will be evident in Fig. 3 of the drawings, and the columns are thus provided with spaced front and rear walls which, with respect to each column, are identified by the same reference characters with the suffix R or F in each instance, to indicate the rear and front walls, respectively, of such columns. Each column has a rearwardly extending supporting arm associated therewith, as indicated, respectively at 208B and 209B in Fig. 3 of the drawings, and these bracing arms are rigidly secured, respectively, as indicated at 208S and 209S to the table top T somewhat rearwardly of the respective columns. These rams 208B and 209B serve to support the columns and the base plate 210 in the relation shown in Fig. 3 wherein a space is afforded between the base plate 210 and the table top T. Such space serves to afford a forwardly opening throat into which sheet feeding means may be inserted as will be described hereinafter. The arms 208B and 209B also serve as supports for opposite ends of a mounting bar 212 which extends between the two arms 208B and 209B in an upwardly spaced relation with respect to the table top T. This mounting bar 212 serves, as will be described, as a portion of a rigid mounting for certain elements of the unit 200.

Figure 12:
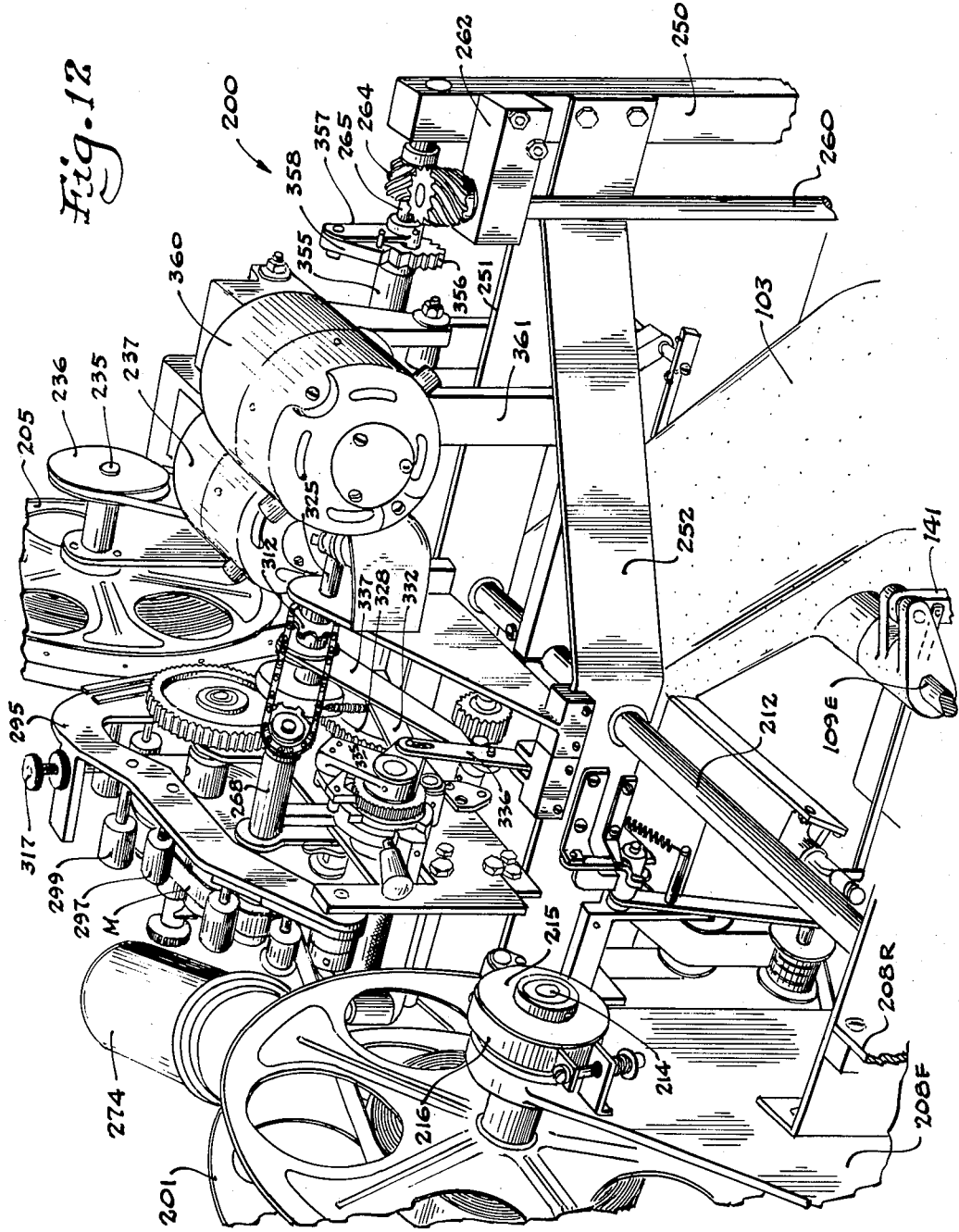
Fig. 12 is a perspective view illustrating the rear portion of the machine.

The column 208, which is located near the right-hand end of the table top T, as viewed in Fig. 1, serves as a mounting for the supply reel 201, and for this purpose a shaft 214, Fig. 12, is extended through the upwardly extended forward wall 208F of the column so that the reel 201 may be secured on the forwardly projecting or outboard portion of the shaft 214. On the rear end of the shaft 214, a brake drum 215 is mounted, and an adjustable, constantly effective brake mechanism 216 is associated with this brake drum so that the unreeling movement of the reel 201 may be readily controlled, as shown in Fig. 12.

Figure 2:
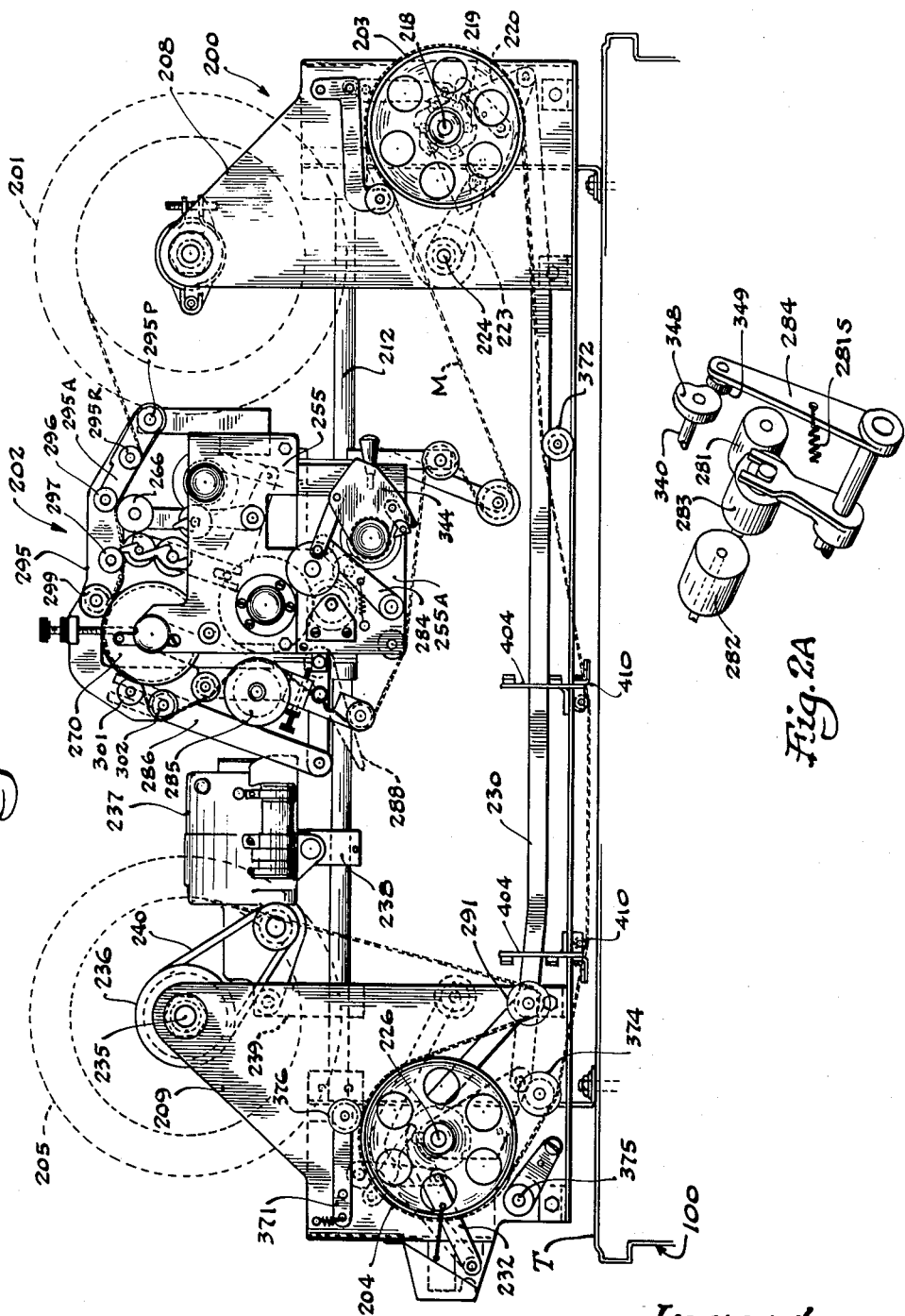
Fig. 2 is a somewhat schematic front elevational view of a portion of the master strip handling and conditioning mechanisms of the machine.

Just beneath the reel 201, the feeding pin wheel 203 is mounted on a shaft 218 that extends rearwardly through the front and rear walls of the column 208, and rearwardly of the rear wall 208R, a ratchet type feed mechanism is afforded whereby the feeding pin wheel 203 may be advanced with a step-by-step action in a clockwise direction as viewed in Fig. 2 of the drawings. For purpose that will appear hereinafter, the mounting of the pin wheel 203 on the shaft 218 is arranged to afford a slight yielding lost motion of the wheel 203 in a forward or feeding direction relative to the shaft 218, and this lost motion is resisted by a torsion spring 203S, Fig. 3. Thus, the shaft 218 has a ratchet wheel 219 fixed thereon, and a rocking plate 220 that is mounted freely on the shaft 218 carries a pawl for imparting advancing movement to the ratchet 219. A holding pawl 221 prevents reverse movement of the ratchet wheel 219. The rocking plate 220 has a pin and slot connection with an arm 223 that is fixed on a rock shaft 224, such rock shaft 224 being driven through a rocking movement in each cycle of operation of the platen mechanism through a bevel gear connection 225 from an extension 109E, Figs. 3, 12 and 16, from the right-hand end of the platen operating rock shaft 109.

The feeding pin wheel 204 is similarly mounted in the column 209, and this accomplished by means including a shaft 226 which projects rearwardly beyond the rear wall 209R of the column 209. At its rear end, the shaft 226 has a ratchet wheel 227, and a rocking plate 228 has a pawl 229 thereon so that the wheel 227 may be actuated by rocking movement of the plate 228. Such rocking movement is imparted to the rocking plate 228 by a link 230 that extends between the rocking plates 220 and 228. The pin wheel 204 is held in any set position by means including a spring biased retaining arm 232 that engages an element that is rotatable with the shaft 226.

The collecting or rewind reel 205 is mounted on the outboard forward end of a shaft 235 that is mounted in the column 209, and on the rear end of the shaft 235, a pulley 236, Fig. 12, is mounted so that winding movements may be imparted to the reel 205 as required. This winding movement is provided from a motor 237 which is supported in part by a bracket 238, Fig. 2, on the mounting bar 212 and in part by a bracket 239 on the column 209. The motor 237 embodies a reduction gearing, the output end of which is connected by a belt 240 to the pulley 236.

Figure 3:
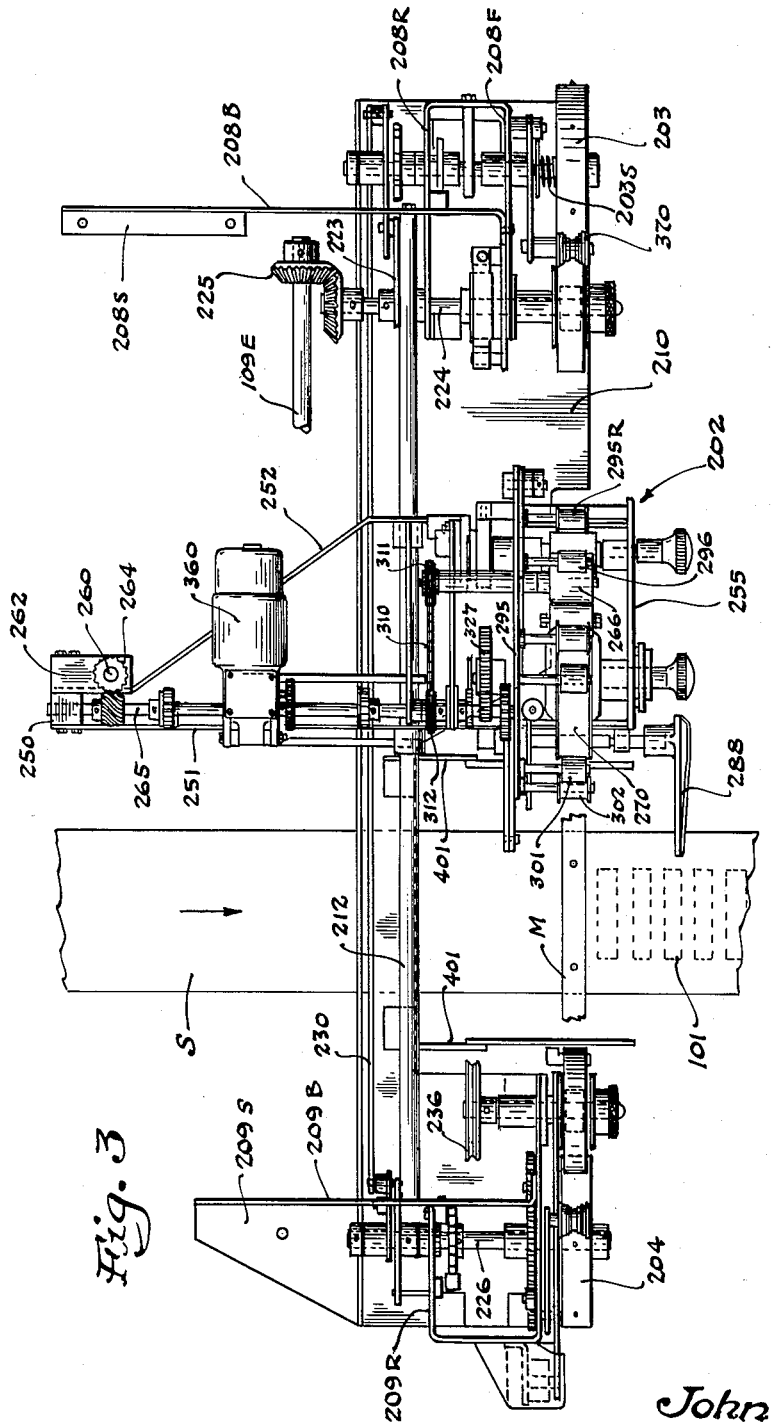
Fig. 3 is a plan view of the master strip handling and conditioning unit shown independently of the base structure of the machine.

The unit 202 embodies a number of elements that must be constantly driven during operation of the machine, and means are afforded for obtaining such drive from the main shaft 115 of the machine. The unit 202 is supported in what may be termed an outboard or overhanging relationship between the two reels 201 and 205, and this is accomplished through structure that is associated with the mounting bar 212. Thus, as will be evident in Figs. 2, 7 and 12, a vertical post 250 of relatively heavy cross section is fixed to the table top T, and extends upwardly from the table top adjacent to the rear edge of the table top and substantially midway between the bracing structures 208B and 209B. The post 250 has a pair of relatively heavy plates 251 and 252 connected thereto at substantially the level of the cross bar 212, and the plate 251 extends directly forwardly, while the plate 252 is bent laterally to the right, as shown in Fig. 3, and just rearwardy of the support bar 212 the plate 252 is bent so as to extend in a forward direction parallel to the plate 251. The two plates 251 and 252 have openings therein through which the support bar 212 is extended, and the two plates 251 and 252 extend for a substantial distance forwardly from the bar 212 so that the projecting forward ends thereof may serve as a mounting or support means for the unit 202.

Figure 5:
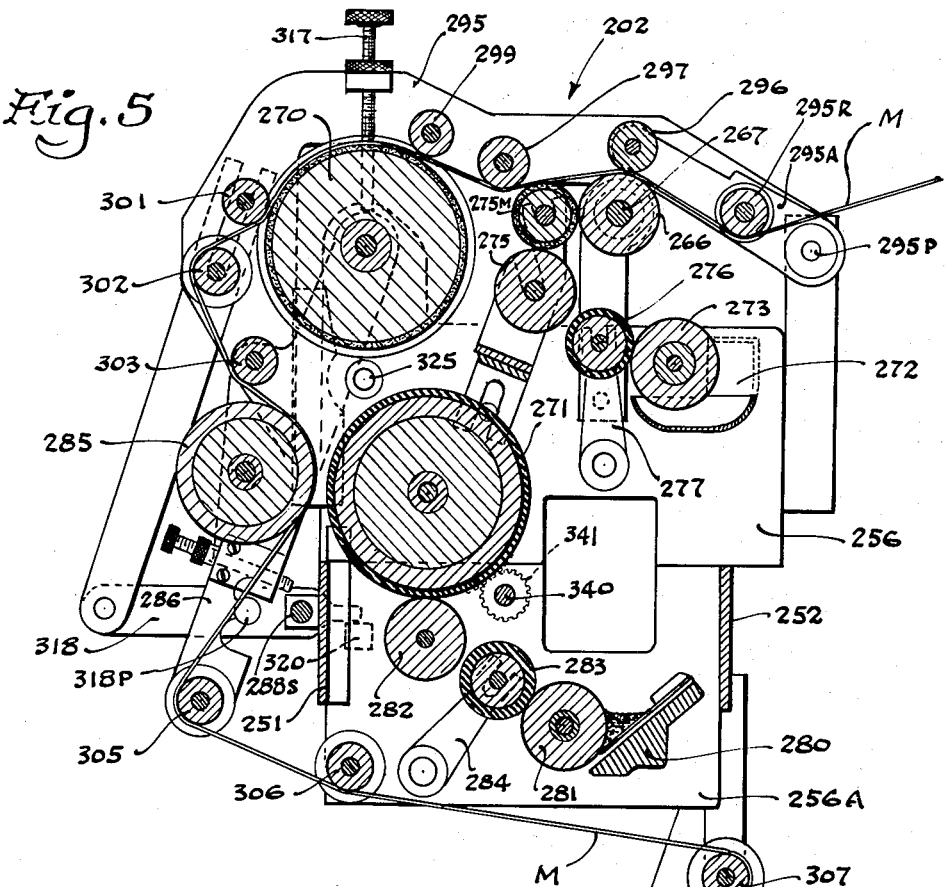
Fig. 5 is a view similar to Fig. 4 and taken partially in vertical section to illustrate additional details of the conditioning unit.

The unit 202 is comprised basically of a pair of parallel frame plates 255 and 256 that are supported in spaced relation by conventional spacer means, and the unit 202 is so formed as to size that the ends of plates 255 and 256 rest upon the upper edges of the two support plates 251 and 252, as shown in Fig. 5. The unit 202 also embodies a separable lower portion which constitutes an ink fountain, and this lower unit embodies plates 255A and 256A which serve the same general purpose as the plates 255 and 256, and this lower portion is secured in place by screws extended through the forward plate 255A of the lower portion.

Figure 18:
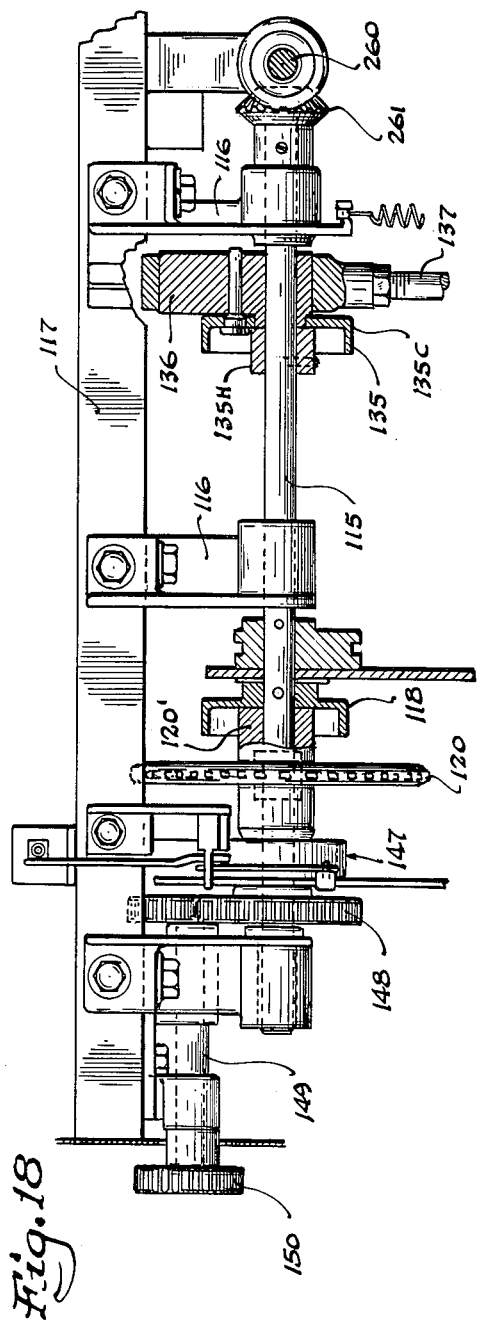
Fig. 18 is a plan sectional view showing portions of the drive mechanism of the machine.
Figure 19:
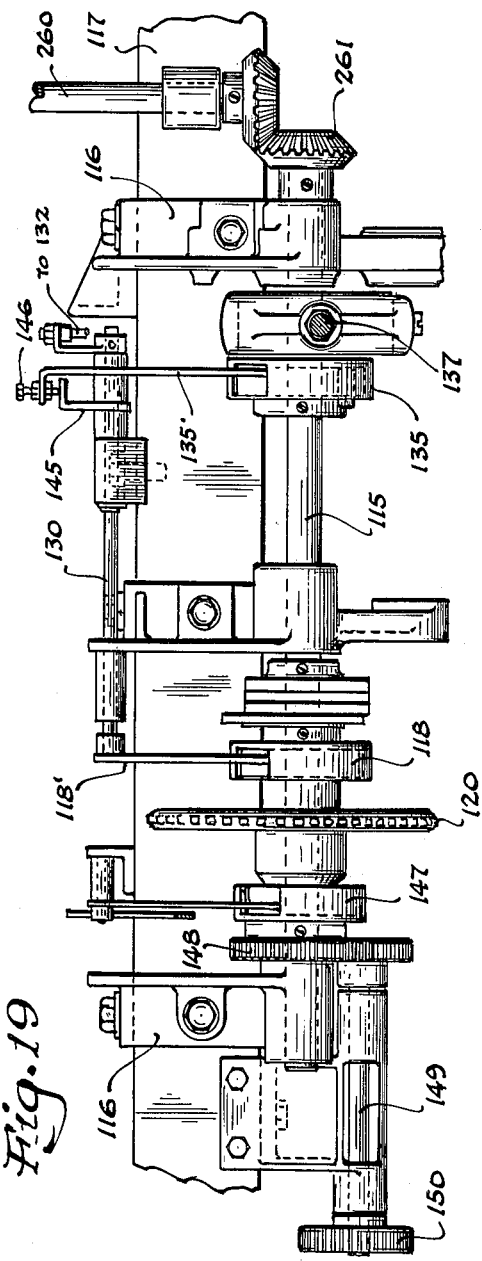
Fig. 19 is a front elevational view of the structure shown in Fig. 18.
Figure 20:
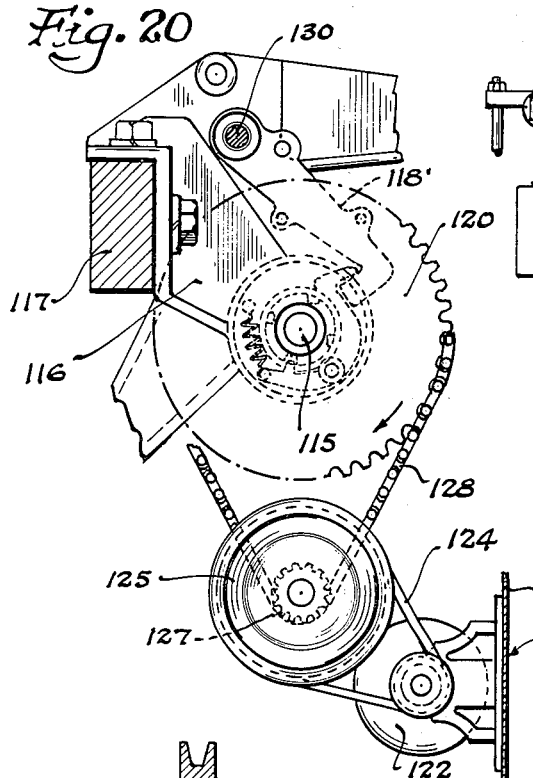
Figs. 20 to 23 are views illustrating details of the drive mechanism and clutch mechanism.
Figure 21:
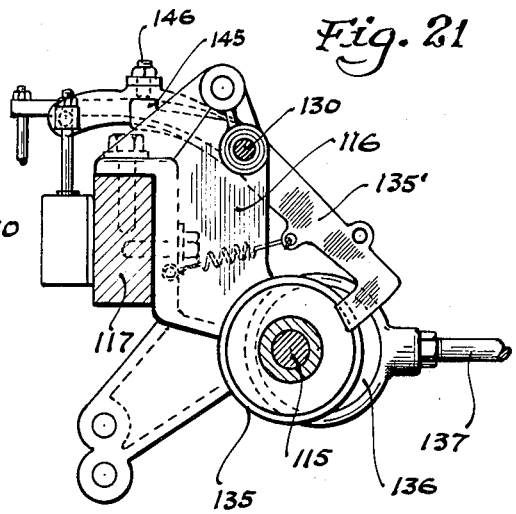
Figure 22:
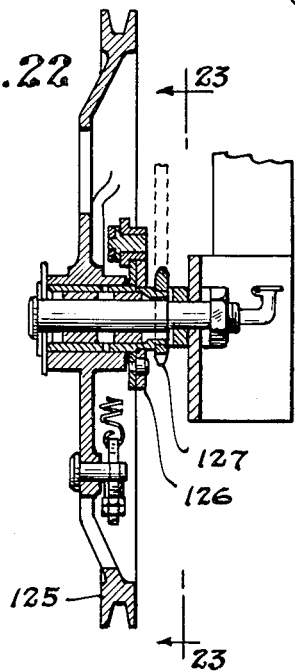
Figure 23:
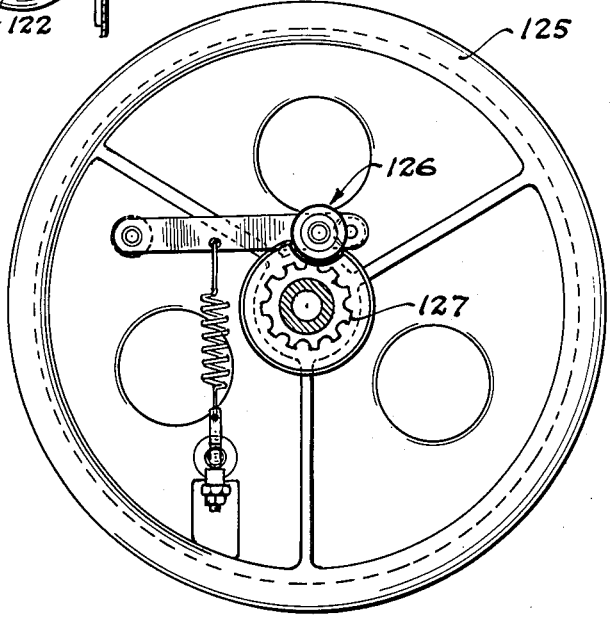

The drive connection between the shaft 115 and the unit 202 is afforded by means including a vertically extending shaft 260 that is connected by means of bevel gearing 261, Figs. 18 and 19, to the right-hand end of the main drive shaft 115 of the machine, and this shaft 260 is extended upwardly adjacent to the post 250 and through a bearing block 262 on and adjacent to the upper end of the post 250. The shaft 261 is provided with helical gearing 264 at its upper end whereby a relatively short horizontal shaft 265 is driven, as will be clear from Fig. 3. This horizontal shaft 265 has its rear end rotatably supported in the upper end of the post 250, and it is operatively associated with the elements of the unit 202, as will hereinafter be described in detail.

In the embodiment of the invention shown in Figs. 1 to 30 of the drawings, the machine is adapted to produce the desired printed impressions through the use of a lithographic process of reproduction, and the image 101M on the master strip M is accordingly produced through the use of a suitable lithographic image forming material. This image forming material with which the image 101M is thus formed is then treated or conditioned for printing operation, and this conditioning is accomplished in the unit 202. Broadly considered, this conditioning of the lithographic strip M is accomplished by first applying moisture to the image-bearing face of the strip M and by then applying lithographic ink to the image, and such treatment is imparted to the master strip M as it passes through the unit 202. Referring to Fig. 5 of the drawings, the unit 202 is illustrated as embodying a driven moistening roll 266 that is mounted in an outboard relation forwardly of the rear plate 255 of the unit adjacent to the upper edge of the unit, such roll 266 being mounted on a shaft 267 which is carried in a rearwardly projecting bearing hub 268 fixed on the rear plate 255. To the left of the roll 266 a large, molleton covered driving and guiding roll 270 is mounted between the plates 255 and 256, and the unit also embodies an inking roll 271 located beneath the roll 270 and between the two plates of the unit 202.

Figure 11:
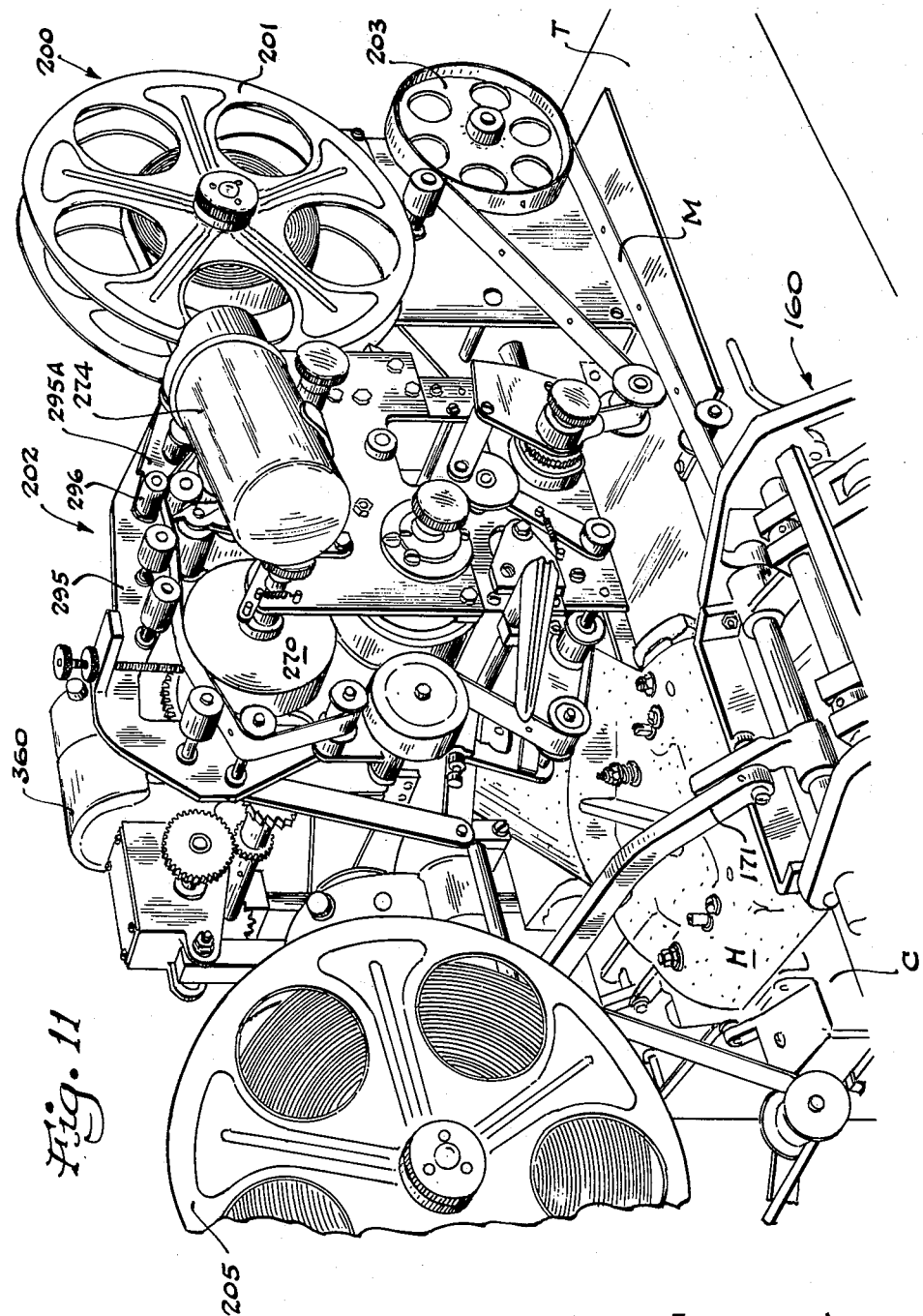
Fig. 11 is a view similar to Fig. 10 and showing the forward portion of the mechanism as viewed from a point located forwardly and somewhat to the left of the machine.

The moistening roll 266 is supplied with moisture from a moistening or liquid reservoir 272 in which a fountain roll 273 is rotatably mounted. The liquid reservoir 272 has the liquid maintained therein at a predetermined level from a liquid supply bottle 274 that is associated therewith in a conventional manner, as shown in Fig. 11 of the drawings. The moistening roll 266 has a molleton-covered moistening roll 275M engaged therewith, while a roll 275 is engaged with the molleton roll 275M, as shown in Fig. 5 of the drawings, and between the roll 275 and the fountain roll 273, a ductor roll 276 is mounted for rocking movement by means including rocking arms 277 so that moisture may be transferred from the fountain roll 273 to the oscillating roll 275.

Figure 6:
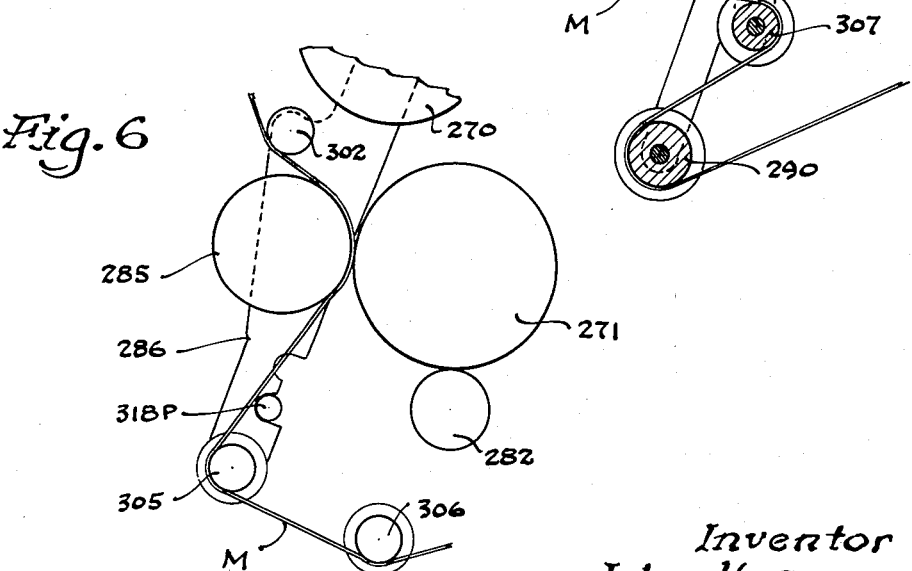
Fig. 6 is a view showing portions of the conditioning unit in a different position.

The ink roll 271 has ink supplied thereto from an ink fountain 280 disposed between lower portions of the frame plates 255A and 256A of the unit 202, and having a fountain roll 281 associated therewith. The ink roll 271 has an oscillating roller 282 engaged therewith, and between the fountain roll 281 and the oscillating roll 282, a ductor roll 283 is mounted for rocking movement between the two rolls by means including a rocking structure 284. Ink is thus transferred at a controlled rate from the ink fountain 280 to the inking roll 271, and the strip M is caused to run against the inking roll 271 by means including a resilient platen roll 285 which is mounted upon an arm structure 286 for movement between a retracted position, as shown in Fig. 5, and a forward or inking position, as shown in Fig. 6. The rocking structure 286 is swung from the axis of the roller 270, and is controlled by cam means associated with a control handle 288.

The master strip M is led from the supply reel 291 past the moistening roll 266, as will be described hereinafter, and then over and about the upper edge portion of the roll 270 and then about the platen roll 285 in such a position that the strip, after moistening, may be pressed against the inking roll 271, and from this position the strip is led about a diablo roll 290 and then about the feed wheel 203. From the feed wheel 203, the strip is led through printing position, as will be described in greater detail hereinafter, and about the feed wheel 204, and from this feed wheel the strip is led about a second diablo roll 291 and then to the rewind reel 205.

Considering the path of the master strip M in greater detail, it will be observed that the unit 202, in the plane of its rear frame plate 256, has a shiftable or vertically retractable supporting plate 295, and this supporting plate 295 carries a plurality of guiding rollers for the master strip M. Thus, the plate 295 is pivoted at its right-hand end on a pivot 295P, and this pivot serves also as a pivot for the right-hand end of a freely swingable arm 295A that is disposed immediately in front of the arm 295. The arm 295A carries a spool-like guide roll 295R beneath which the master strip M is extended. Just to the left of the roller 295R, a pressure roll 296 is provided on the arm 295A in a position opposite the roll 266, and the master strip extends beneath the roller 296 and is pressed, by the weight of the roller 296 and the arm 295A, into engagement with the roll 266. Somewhat to the left of the roller 296 and beyond the roll 275M, the master strip extends beneath another guide or pressure roll 297 that is carried on the plate 295, and the normal position of the guide roller 297 is such that the strip M is held in engagement with the molleton covered roll 275M. The master strip then extends under a guide roller 299 that is carried on the plate 295, and then about an arcuate portion of the roll 270. The rolls 297 and 299 are all carried on the retractable plate 295 so that the strip M in the portion that is associated with such rolls may be raised in the manner and for the purposes hereinafter described.

Figure 4:
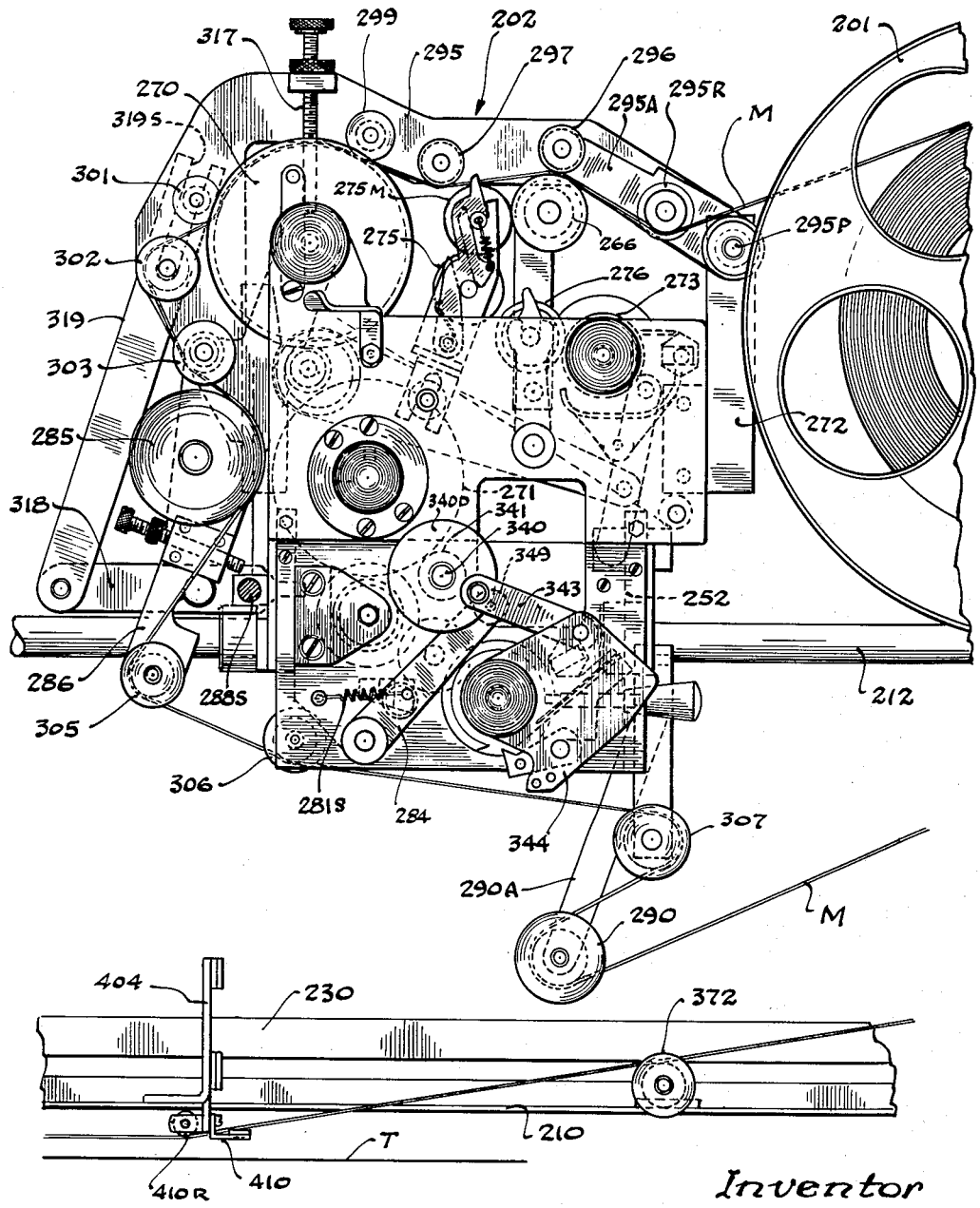
Fig. 4 is an enlarged front elevational view of the strip conditioning unit and a portion of the strip guiding and feeding means.

The strip then extends under a further guide roll 301 and then about a spool-like guide roll 302, the strip being held against the roll 270 by the guide roll 301 and being then led away from the roll 270 and about the outer or left-hand side of the roll 302. The strip M then extends downwardly and beneath a spool-like guide roll 303 from which the strip M extends to the right, as shown in Fig. 4, and about the right-hand side of the platen roll 285. The rolls 301, 302, and 303 are mounted on a downward extension of the shiftable plate 295 so as to be moved with such plate, as will be described. The master strip then extends downwardly and somewhat to the left and about the left-hand side of a spool-like guide roll 305, and the master strip then extends to the right and somewhat downwardly and beneath the spool-like guide member 306 that is located in the lower left-hand portion of the frame of the unit 202. The master strip M then extends to the right and about a spool-like stationary guide roll 307 from which the strip is extended to the left and downwardly and about the diablo roller 290.

The master strip M, as it is initially fed into the unit 202, is subjected to a controlled wetting or cleaning operation by means of the roll 266, which is driven in a direction counter to the direction of movement of the strip M so as to apply a minimum amount of moisture. The roll 266, in normal operation of the machine, engages the master strip M in the portion beneath the gravity pressure roll 296. The roll 266 is driven by a chain 310, Fig. 3, which extends about sprockets 311 and 312 mounted respectively on the shaft 267 and on a drive shaft that will be described presently. The molleton covered roll 275M, being in constant engagement with the driven moistening roll 266, is constantly driven in a counter-clockwise direction, Fig. 5, and such drive is, of course, transmitted to the roll 275. The surface speed of the rolls 266 and 275M is, of course, the same, and this surface speed is somewhat greater than the surface speed of the molleton covered feed roll 270. Thus, moisture is first applied to the strip M with a rapid reverse scrubbing action by the roll 266, and then with a forward scrubbing action by the molleton covered roll 275M. This causes the moisture to be effectually applied and distributed on the strip M, and then as the strip advances in face to face contact with the molleton covered feed roll 270, a blotting action is applied to the strip by the molleton covering of the roll 270 so as to thereby attain proper and uniform conditioning of the master strip M.

Provision is made, however, for disengaging the master strip M from the moisture laden molleton covered rolls 275M and 270, so that during periods when the machine is not in use, the master strip will not be in contact with any substantial source of moisture. To this end, the mounting plate 295 is arranged for upward shifting movement about its pivot 295P. This pivotal mounting allows the left-hand end of the mounting plate 295 to move downwardly to an extent that is determined by an adjustable stop screw 317 that is arranged at its lower end to bear upon the stationary pivotal mounting structure of the feed roll 270. When the master strip M is to be shifted to a retracted or elevated position with respect to the molleton rolls, this is accomplished through operation of the handle 288. For this purpose, the handle 288 is mounted on a shaft 288S, and on the rear end of the shaft an arm 318 extends generally in a left-hand direction. This arm 318 has a pin 318P thereon that is arranged to engage formed surfaces on the pivot structure 286 for permitting engagement or right-hand movement of the platen roll 285 or to shift the platen roll 285 to its left-hand or retracted position of Fig. 5. The outer or left-hand end of the arm 318 has an upwardly extending link 319 connected thereto, and at its upper end this link is slotted as at 319S. The slot 319S embraces the projecting mounting pin of the guide roll 302, and when the arm 318 is shifted to the platen-retracting position of Fig. 4, the lower end of the slot 319S is engaged with the pin of the roller 302. Then, upon further clockwise movement of the handle 288, the lower end of the slot 319S engages and moves the pin 302 upwardly, and since this pin 302 is mounted in a swingable plate 295, the plate 295 and all of the rollers mounted thereon are moved in an upward direction around the pivot 295P. This movement terminates when the pin 318P is registered with a slot in the arm 286, such slot being just above the position at which the pin 318P is shown in Fig. 5. The engagement of the pin 318P with this slot serves to hold the mounting plate 295 and the several rolls carried thereby in desired elevated position in which the master strip M is held out of the contact with respect to the molleton rolls 270 and 275M.

When the frame 295 is thus elevated, a switch 320 is engaged by the projection right-hand end of the lever 318, and this is arranged to break the operating circuit of the machine, or, in other words, to stop the driving motor of the machine.

The main shaft 265 is arranged, as will be described in some detail hereinafter, to drive the unit 202, and in accomplishing this, the shaft 265 drives an aligned forwardly extended shaft 325, Figs. 7 and 13, that terminates at the rear frame plate of the unit 202. This shaft 325 has a pinion 326 thereon that engages a gear 327 which is fixed to the rear end of the shaft upon which the roll 270 is mounted, and thus the roll is driven in accordance with the rotative speed of the shaft 325. The inking or form roll 271 is also driven from the same source and at a corresponding speed by means including a gear 328 that is located below and meshed with the pinion 326, this gear 328 being fixed to the shaft of the form of inking roll 271.

The shaft 325 which has the sprocket 312, also has a cam 330, Fig. 13, mounted thereon which is arranged to engage a cam roller 331 that is fixed on an arm 332. The cam roller 331 is disposed beneath the cam 330, and the arm 332 is spring biased upwardly. This arm 332 is fixed to the rocking structure 277 of the ductor roll 276, so that the ductor roll 276 is rocked back and forth between the rolls 273 and 275 in each rotative movement of the shaft 325, as shown in Fig. 12.

The fountain roller 273 is advanced through relatively small indexing movements in each rotation of the shaft 325, and for this purpose a rocking pawl structure 335 is afforded in association with the rear end of the fountain roll 273. This rocking structure has a pin and slot connection with a vertically extended lever 336 that is pivoted at its lower end on a bracket that is mounted on the support bar 252, and intermediate its ends, this lever 336 is connected by a crank 337 to the eccentric 338 that is fixed on the shaft 325 just rearwardly of the cam 330. The ink fountain structure is also driven indirectly from the shaft 325, and for this purpose, a drive shaft 340 is extended through the unit 202 just below and somewhat to the right of the form roll 271. At its rear end, this shaft 340 has a pinion 341, Fig. 5, meshed with the lower edge of the gear 328 so that the shaft 340 will be driven from the gear 328. At its forward end, the shaft 340 has a disc 340D fixed thereon, and this disc has a crank link 343 connected eccentrically thereto, as shown in Fig. 4. The other end of the link 343 is connected to a ratchet and pawl type of rocking structure 344 which is associated with the fountian roll 281 of the ink fountain in a conventional manner so that this fountain roll is advanced in relatively small indexing increments. The shaft 340 also has a cam 348 fixed thereon which engages a cam roller 349, this cam roller 349 being provided on the end of one of the rocking arms 284 which support the ductor roll 283 of the ink fountain structure. A spring 281S urges the rocking structure 284 in such a direction as to maintain the cam roller 349 in engagement with the cam 348. This serves to impart the necessary ink-transfer movements to the ductor roll 283.

It will be recalled that the pin feed wheel 203 is driven from and in timed relation with respect to the operations of the platen mechanism, while the roll 270 which serves to withdraw the master strip M from the supply reel 201 is driven through a different connection from the main shaft 115 of the machine. With two such independent actuating means acting on the master strip M, it is important that provision be made to avoid undue tension in the master strip M which might tend to break such strip. Means are therefore afforded for driving the unit 202 at an increased speed when the amount or length of master strip between the unit 202 and the pin wheel 203 becomes obectionably short. In accomplishing this, the diablo roller 290 is utilized as a control means. Thus, as will be evident particularly in Figs. 4, 8 and 9, the diablo roller 290 is mounted on a swinging arm 290A that is suspended by means of a bracket 350 from the frame plate 252. The arm 290A is spring biased in a left-hand direction by means of a spring 290S, but, as the length of master strip between the unit 202 and the pin wheel 203 becomes progressively shorter, the arm 290A is swung to the right or in a counterclockwise direction. After movement to substantially the dotted line position shown in Fig. 8, the arm 290A is effective to initiate operation of an overdriving or high speed drive mechanism for the unit 202. This is accomplished by means including a cam 351 fixed on the mounting shaft of the arm 290A and a switch operating lever mechanism 352 which serves to operate a switch.

The overdriving or high speed drive mechanism for the unit 202 is best illustrated in Figs. 13, 14 and 15 of the drawings. Thus, the shaft 265 is aligned with the shaft 325, and the shaft 325 has an elongated sleeve 355 pinned thereon so as to extend for a substantial distance to the left over the adjacent end of the shaft 265. This sleeve 355 has a ratchet wheel 356 formed as a flange on its left-hand end, and a pawl-carrying arm 357 is fixed on the shaft 265 adjacent to the ratchet wheel 356. The arm 357 has a pawl 358 thereon that is spring urged into engagement with the ratchet wheel 356 so that rotation of the shaft 265 normally tends through the pawl 358 and the ratchet 356 to drive the sleeve 355, which, by reason of its pinned connection to the shaft 325, serves to drive such shaft. The shaft 325 may, however, be driven at a higher speed, as will be described, and when this is done, the ratchet wheel 356 in effect overdrives with respect to the pawl 358 and the normal drive shaft 265. Such high speed drive is attained from a motor 360 that is supported by means of a bracket 361 from the frame plate 251, and this motor 360 has a reduction gearing associated therewith which terminates in an output gear 362. This gear is meshed with a pinion 363 that is formed as a flange on one end of a sleeve 364 that is rotatably mounted on the shaft 325 just to the right of the sleeve 355. This sleeve 364 has an arm 365 thereon that carries a spring biased driving pawl 366, and the pawl 366 is arranged to engage a ratchet wheel 367 that is pinned on the shaft 325 adjacent to the right-hand end of the sleeve 364. When the motor 360 is stationary, the ratchet 356 is driven through the pawl 358 from the normal drive shaft 265, and the ratchet wheel 367 overdrives with respect to the then stationary pawl 366. When, however, the diablo 290 is effective to close the control switch of the motor 360, the sleeve 364 is driven at a speed higher than the normal rotative speed of the shaft 265, and when this occurs, the pawl 366 is effective to drive the ratchet 367, thereby to drive the shaft 325 at an increased speed. During such high speed drive, the ratchet wheel 356 in effect overdrives with respect to the pawl 358, which, it should be noted, continues to move in a rotative manner at the normal speed of the shaft 265. When the length of master strip M between the unit 202 and the pin wheel 203 has been increased in a sufficient amount to allow the diablo 290 to return for a substantial distance to the left, the control switch of the motor 360 is opened and the normal driving action of the shaft 265 is restored.

The master strip M is held against the upper surface of the pin feeding wheel 203 by a spring biased pressure roller 370, Fig. 10, that is mounted on a spring biased mounting arm 371 carried on the forward wall of the column 208, and somewhat to the right of the platen mechanism. The lower run of the strip M is guided across a guide roller 372, Fig. 2, that is mounted on the base plate 210.

Just to the left of the normal location of the diablo roller 291, another spool-like guide roll 374 is mounted to guide the lower run of the master strip M into proper cooperation with the feed wheel 204, and the strip is held against the lower face of the feed wheel 204 by a driven roller 375 that is driven at the same surface speed as the feed roll 204. At the top of the feed wheel 204, the master strip M is held against the feed wheel by a roller 376 that is mounted on a spring biased arm 377 that is mounted on the forward face of the column 209, as shown in Fig. 2.

Where the lower run of the master strip M is passed beneath the platen roller PR, this strip is supported and guided by a shiftable guide frame 400 that is best shown in Figs. 26 to 29. This guide frame is arranged not only to support the portion of the master strip M that is to be the subject of a printing operation, but also to move this portion of the master strip up and down so as to thereby facilitate the movement of sheets into position to receive printed impressions, and such up and down shifting movement of the strip M at the printing station is made possible by the yielding lost motion mounting of the feed wheel 203 in cooperation with the diablo 290. Thus, the plate 210 has a pair of supporting brackets 401 extended upwardly therefrom, and each of the brackets 401 has a pair of vertically spaced arms 403 pivoted thereto and extended generally in a forward direction therefrom. At their forward ends, the arms or links 403 are connected by a vertical bar 404, one such bar 404 being provided for each pair of links 403. Thus, there is provided on each of the brackets 401, a parallelogram linkage in which the link or bar 404 is maintained in a vertical position when the parallelogram linkage is moved with respect to its supporting bracket 401. The links or bars 401 are formed integrally with forwardly extending horizontal bars 406, and these links 406 have horizontal or longitudinal slots 406R formed therein. The forward ends of the bars 406 are rigidly connected by a cross bar 406B. The location of the parallelogram linkage structure is such that the two bars 406 are located at opposite ends of the platen roller structure, and these bars 406 are of a length somewhat greater than the stroke of the carriage C. The ends of the platen roller shaft 106 are extended through the two slots 406R, and hence, when the platen mechanism is operated through its printing cycle, the links 406 are moved downwardly and during such movement the shaft 106, of course, moves longitudinally in the slots 406R. Then, when the platen roller has reached its forward and downward position, and is moved rearwardly through its printing stroke, the arms 406 are maintained in their lower position shown in Fig. 27 of the drawings. At the end of the cycle, the upper or return movement of the platen roller serves to lift the arms 406 to the position shown in Fig. 26.

The intermediate portion of the master strip M is supported and guided on the arms 406, as will now be described. Thus, each of the arms 406 has a guide fitting 410 fixed thereon, and each such guide fitting includes a roller 410R. The master strip M is arranged to run beneath the two rollers and across the top of a supporting cutoff plate 411 that has its opposite ends carried on the brackets 410 below the rollers 410R. The plate 411 has an opening 412 formed therein through which the image 101M is exposed when the master strip M comes to rest. Thus, when the portion of the strip M between the two rollers 410R is lowered as an incident to the forward and downward movement of the platen roller PR, this portion of the master strip M is put in position directly over the sheet S, and in the rearward rolling movement of the platen roller PR the portion of the strip that is registered with the opening 412 is pressed downwardly so as to make the desired impression 101 on the sheet S. Upon completion of the impression, the platen roller is allowed to return to its elevated position of Fig. 26 as described in the aforesaid Hueber patents, thus raising the guide structure so as to afford space into or through which the sheet S may be moved.

The strip M is then advanced so as to bring another image 101 into position beneath the platen, and as this advancing movement takes place, the diablo roller 291 is allowed to move in a downward direction. Such downward movement of the diablo roller 291 is arranged through a suitable switch to control the energizing circuit for the rewind motor 237, thus to cause winding operation of the reel 205 until the diablo roller 291 has been raised to a predetermined position.

Figure 31:
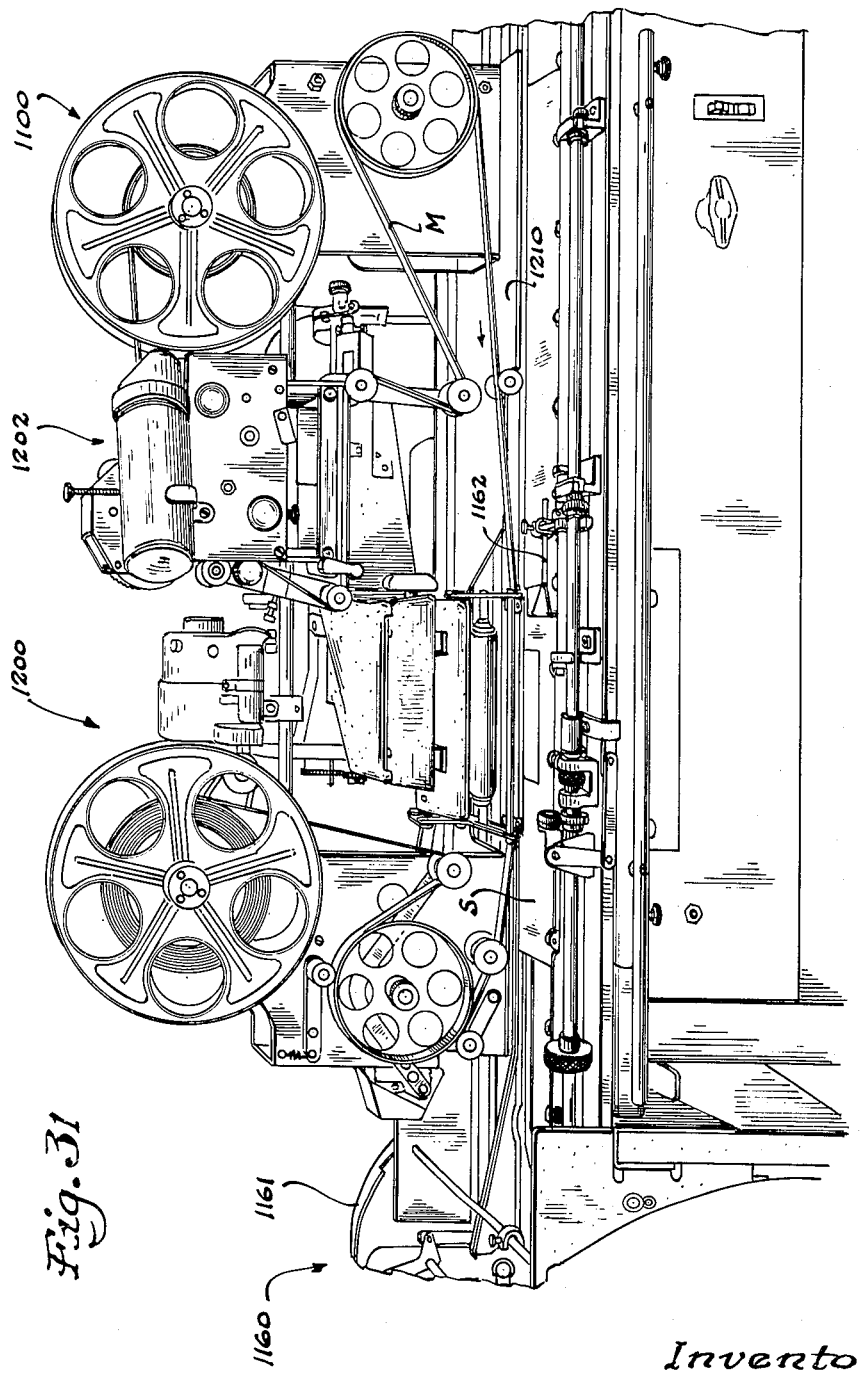
Fig. 31 illustrates an alternative embodiment of the invention adapted for utilizing a master strip made in accordance with the spirit transfer process.

In the embodiment of the invention shown in Figs. 31 to 38, the machine is constructed so as to utilize a master strip M that has the images formed thereon by means of a carbon material which, when moistened, will be effective to transfer a portion of the carbon to a sheet, thus to produce a printed impression in accordance with the well-known spirit transfer process. In Figs. 31 to 38, the machine has been identified as a machine 1100, and this machine is in many respects similar to the machine 100 heretofore described. In the machine 1100, however, the sheets S are individually fed to printing position by means of a sheet feeder 1160 which may be of the general construction illustrated and described in the Morse Patent No. 2,359,852, patented October 10, 1944, and modified so that the sheets are separated from the supply stack by the suction feeder mechanism shown in Curtis Patent No. 2,358,560, patented September 19, 1944. This sheet feeder embodies a suction type sheet separator construction 1161 of the form shown in the aforesaid Curtis patent, and this unit 1161 is disposed at the left-hand end of the machine frame, as shown in Fig. 31. The balance of the sheet feeder is constructed according to the aforesaid Morse patent and embodies a relatively shallow bridge structure which carries feed belts and which in the present instance is disposed in part in the throat beneath the plate 1210. On such bridge structure of the feeder, stop finger mechanisms 1162 are afforded whereby sheets S separated by the unit 1161 may be brought to rest momentarily beneath the platen mechanism of the machine so that an impression may be made thereon from the master strip M. The stop finger 1162 is then raised and the sheet is allowed to be discharged to the right into a suitable collector mechanism, as described in the aforesaid Patent No. 2,359,852.

In the machine 1100, the master strip M is fed and conditioned by a unit 1200 which, in many respects, is like the unit 200 of the previously described embodiment of the invention, and this unit 1200 embodies a base plate 1210 which, in its forward portions, is spaced upwardly from the table top of the machine frame, thereby to enable the sheet feeder structure to be moved rearwardly into position over the table top T in the same manner as described in the aforesaid Patent No. 2,359,-852. The sheet feeder unit 1160 is operatively associated with the gear 150 previously described in connection with the other embodiment of the invention, and since the rotative movements of this gear are timed with relation to the operations of the platen mechanism, the gear 150 serves to cause operation of the sheet feeder mechanism 1160 in timed relation to the operation of the platen mechanism and the operation of the feeding and treating unit 1200.

The platen mechanism of the machine 1100 is the same as hereinbefore described, and the mechanism in the unit 1200 for feeding and conditioning the master strip M is, in most respects, similar to the unit 200. Likewise, the conditioning unit 1202 is in many respects similar to the unit 202, but in the unit 1202, the lower portion or section is eliminated since this unit does not embody an inking means. Similarly, the moistening roll 266 is eliminated in this unit 1202, and a single moistening operation is performed on the master strip M by a moistening roller 1271 which is located in the same position and relationship as the inking roll 271 of the previously described conditioning unit. In this embodiment of the invention the unit 1202 embodies a roller 1270, and the master strip M runs from the supply reel 1201 to the left as shown in Fig. 35 and beneath a first spool-like guide roller 1298 and beneath a pressure roller 1299, these two last mentioned rollers being mounted on a pivoted supporting frame 1295, so that the two rollers may be raised and lowered when the unit 1202 is to be thrown out of operation. The master strip M runs to the left from the roller 1299 and downwardly about the roller 1270, and just below the roller 1270 the strip runs past and about the right-hand side of a spool-like guide roller 1303. Just below the roller 1303, the master strip M runs about a knurled drive roller 1285, which normally acts to press the face of the master strip M against the moistening roller 1271. It will be observed that the roller 1285 thus serves the same general function as the platen roller 285, and this roller 1285 is driven by means of gearing 1285G at the same surface speed as the moistening roller 1271. The gearing 1285G is arranged to be driven from the intermediate pinion 1326, which is mounted on the main drive shaft of the unit 1202. The rollers 1285 and 1303 are mounted in a forwardly projecting relationship on a downwardly extended mounting arm 1286, which is suspended from the rotative axis of the roller 1270, and this arm 1286 may be swung in a clockwise direction or to the left in Fig. 35 by means of an operating arm 1288A fixed on a horizontally controlled shaft 1288S, the forward end of this shaft having an operating handle 1288 fixed thereon, as will be evident in Fig. 33 of the drawings. The master strip M may thus be withdrawn from contact with the moistening roller 1271 when this is desired.

The moistening roller 1271 is provided with the requisite moisture supply from a fountain 1272, as shown in Fig. 35, there being a fountain roller 1273 running in the fountain 1272, as will be described hereinafter. Moisture from the fountain roll 1272 is transferred by a ductor roll 1276 to an oscillating roll 1275 that contacts the moistening roll 1271.

The fountain roll 1272 is arranged to be advanced or indexed periodically in the operation of the machine by a ratchet and pawl mechanism 1328, which is driven by means including a lever 1336 and a link 1337 from an eccentric 1338 on the main drive shaft 1325. The ductor roll 1276 is supported on a rocking structure 1277, and this rocking structure 1277 is moved through the requisite rocking movements by means including a cam 1330 fixed on the shaft 1325 and acting through a lever 1332 that extends to the rocking structure 1277. Thus, the fountain roll 1272 is gradually indexed, and moisture from the roll 1272 is transferred by the ductor roll 1277 to the roll 1275 and thence to the moistening roll 1271, thereby to cause the master strip M to be moistened as it passes the roll 1271. The rolls 1271 and 1275 are molleton covered so that the moisture is in this instance applied to the strip M by the moisture-carrying molleton covering of the roll 1271.

The master strip M passes downwardly from the moistening roll 1271 and about a spool-like guide roller 1305 that is mounted on the lower end of the arm 1286, and the path of the master strip M is thereafter substantially the same as hereinbefore described in respect to the other embodiment of the invention, and similar structural elements are identified by the same reference characters with the prefix "1" added in each instance.

The unit 1202 is in the present instance driven from the main shaft of the machine by a vertically extended shaft 1260 having gearing at the upper end thereof in the same manner as in the other embodiment of the invention. This gearing is connected to and associated with the shaft 1325 through an overdrive mechanism of the same construction as described in connection with the other embodiment of the invention, whereby the feeding and conditioning unit may be driven at an increased speed as hereinbefore described.

From the foregoing description it will be evident that the present invention enables printing operations to be performed advantageously from elongated master strips, and enables this to be accomplished from such strips prepared in accordance with either the lithographic or spirit duplicating processes. It will be evident that through the employement of the present invention, a master list maintained on either cards or embossed printing plates may be rendered more useful through the production of secondary reproduceable lists in strip form, thereby to enable mailing pieces, check lists, and the like to be thereafter prepared from such strip-like printing lists independent of the availability of the master list or file.

Under the present invention, the feeding and conditioning of the supplemental printing strip is automatically governed, and the making of good quality impressions is assured, and where the printing strip is prepared in accordance with the lithographic process, the strip is uniformly conditioned for the reception of ink by a novel and varied working of the moisture onto and into the image-bearing face of the strip.

It will also be evident that under the present invention, the continuous printing strip is controlled at all times as to position and feeding movements, and as a result, the impressions may be accurately located and the feeding of impression strips or sheets to impression position may be readily and easily accomplished.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a printing machine of the character described having means including a platen roller defining a printing station, means for feeding an elongated master strip in a step-by-step manner across said printing station and including a supply reel, means located intermediate said supply reel and said printing station for applying moisture to said master strip, ink supplying means for applying ink to the master strip after moisture has been applied thereto by said moisture applying means, first roller means for holding such master strip in association with said ink applying means, a first pivotable plate means for shifting said last named roller means to a retracted position wherein such master strip in separated from said ink applying means, a second roller means for guiding and holding such master strip with relation to such moisture applying means and arranged to be shifted to a retracted position wherein such master strip is separated from at least a portion of said moisture applying means, and manually operable means for simultaneously shifting said first and second roller means to their respective retracted positions in succession.

2. In a printing machine of the character described having means including a platen roller defining a printing station, means for feeding an elongated master strip in a step-by-step manner across said printing station and including a supply reel, means located intermediate said supply reel and said printing station for applying moisture to said master strip, ink supplying means for applying ink to the master strip after moisture has been applied thereto by said moisture applying means, roller means carried in a first pivotable mounting means for holding such master strip in association with said ink applying means, a first means for shifting said first mounting means to a retracted position wherein such master strip is separated from said ink applying means, a second roller means for holding such master strip with relation to such moisture applying means, the second roller means being carried in a second pivotable mounting means arranged to be shifted to a retracted position wherein such master strip is separated from at least a portion of said moisture applying means, and a common manual operating means for moving said first and second mounting means simultaneously to and from said retracted positions.

3. In a printing machine of the character described, means affording a printing station defined by an anvil and a roller platen, said roller platen being carried in an actuatable mechanism for movement between an elevated inactive position and a lower active position in which the platen roller may be rolled through an impression forming operation, means for feeding sheets into position beneath said platen roller, means for feeding an elongated master strip across said printing station, means connected to and operated by said platen roller and effective to raise and lower said master strip relative to said anvil in timed relation to the raising and lowering movements of said platen roller, and means associated with the feed means for the master strip to maintain the master strip taut at the printing station.

4. In a printing machine of the character described, means affording a printing station defined by an anvil and a roller platen, said roller platen being mounted in mechanism for movement between an elevated inactive position and a lower active position in which the platen roller may be rolled through an impression forming operation, means for feeding sheets into position beneath said platen roller, means for feeding an elongated master strip across said printing station, means including an impression defining guard plate disposed beneath said platen roller and across which the master strip is extended, the last named means being connected to and operated by said mechanism and effective to raise and lower said guard plate and the associated portion of a master strip relative to said anvil in timed relation to the raising and lowering movements of said platen roller, and means associated with the strip feeding means to maintain the master strip taut while the guard plate is being lowered.

5. In a printing machine of the character described embodying a frame having a table top, means mounted on said frame and affording a roller platen in operative association with said table top to define a printing station, a base plate connected to said table top at points located rearwardly of said printing station and arranged to support said roller platen in upwardly spaced relationship with respect to said table top, the roller platen being vertically shiftable to and from printing position relative to the table top, means for feeding a master strip across said printing station and beneath said platen roller and including a supply reel and a rewind reel mounted on said base plate, means on said base plate affording a first shaft supporting a first feed wheel and a second shaft supporting a second feed wheel, means driven in timed relation to said platen roller to impart corresponding indexing movements to said shafts, a conditioning unit driven in timed relation to said platen roller for withdrawing a master strip from said supply reel and feeding the same to said first feed wheel, frame means for supporting and guiding such strip across the printing station and operable to raise and lower the strip at said printing station in timed relation to the movements of said platen roller, means including an independently operated overdrive for driving said conditioning unit at a higher speed when a sufficient amount of master strip is not located between said conditioning unit and said first feed wheel, and a lost motion arrangement associated with the first feed wheel to maintain the master strip taut at said printing station.

6. In a printing machine of the character described embodying a frame having a table top, means mounted on said frame and affording an impression member in operative association with said table top to provide a printing station, driving means for operating said impression member vertically up and down through impression cycles, means for feeding a master strip across said printing station and beneath said impression member and including a base plate connected to said table top at points located rearwardly of said printing station and arranged to support said impression member in upwardly spaced relationship with respect to said table top, supply and rewind reels mounted on said base plate, means on said base plate affording a first shaft supporting a first feed wheel and a second shaft supporting a second feed wheel, means driven in timed relation to said impression member to impart corresponding indexing movements to said shafts, a conditioning unit driven from said driving unit in timed relation to said impression member for withdrawing a master strip from said supply reel and feeding the same to said first feed wheel, means for supporting and guiding such strip across the printing station and operable to raise and lower the strip at said printing station in timed relation to the movements of said impression member, independent means for driving said rewind reel, and a lost motion arrangement associated with the master strip feeding means to maintain the master strip taut while being lowered by the said supporting and guiding means therefor.

7. In a printing machine of the character described embodying a frame having a table top, means mounted on said frame and affording an impression mechanism including an impression member in operative association with said table top to afford a printing station, driving means for operating said impression mechanism vertically up and down through impression cycles, means for feeding a master strip across said printing station and beneath said impression member and including a base plate connected to said table top at points located rearwardly of said printing station and arranged to support said impression mechanism in upwardly spaced relationship with respect to said table top, means for supporting a continuous master strip including supply and rewind reels mounted on said base plate, means on said base plate affording a first shaft supporting a first feed wheel and a second shaft supporting a second feed wheel, means driven in timed relation to said impression member to impart corresponding indexing movements to said shafts, a conditioning unit driven from said driving unit normally driven at a constant speed related to the operations of said impression member for withdrawing a master strip from said supply reel and feeding the same to said first feed wheel, frame means for supporting and guiding such strip across the printing station and operable to raise and lower the strip at said printing station in timed relation to the movements of said impression member, independent means for driving said rewind reel, the frame means being connected to and operated by the impression mechanism, and a lost motion arrangement associated with the first feed wheel to maintain the master strip taut at the printing station while being lowered by said frame means.

8. In a printing machine of the character described embodying a frame having a table top, means mounted on said frame and affording an impression mechanism including a roller platen in operative association with said table top to afford a printing station, a base plate connected to said table top at points located rearwardly of said printing station and arranged to support said impression mechanism in upwardly spaced relationship with respect to said table top, means for supporting and feeding a master strip across said printing station and beneath said platen roller and including a supply reel and a rewind reel mounted on said base plate, means on said base plate affording a first shaft supporting a first feed wheel and a second shaft supporting a second feed wheel, means driven in timed relation to said platen roller to impart corresponding indexing movements to said shafts, a conditioning unit driven normally at a constant speed related to the speed of said platen roller for withdrawing a master strip from said supply reel and feeding the same to said first feed wheel, means for supporting and guiding such strip across the printing station and to said second feed wheel and operable to raise and lower the strip at said printing station in timed relation to the movements of said platen roller, means including an independently operated overdrive for driving said conditioning unit at a higher speed when a sufficient amount of master strip is not located between said conditioning unit and said first feed wheel, means responsive to the length of master strip between said second feed wheel and said rewind reel for driving said rewind reel, means for vertically shifting the impression mechanism to carry the roller platen to and from impression position, and a lost motion arrangement associated with the first feed wheel to maintain the master strip at the printing station taut while being lowered into printing position by the said supporting and guiding means therefor.

9. In a printing machine of the character described embodying a frame having a table top, means mounted on said frame and affording an impression member in operative association with said table top to define a printing station, means to raise and lower the impression member during impression cycles, a base plate connected to said table top at points located rearwardly of said printing station and arranged to support said impression member in upwardly spaced relationship with respect to said table top to define a forwardly opening throat between said plate and said table top into which sheet feed means may be inserted, means for feeding a master strip across said printing station and beneath said impression member and including a supply reel and a rewind reel mounted on said base plate, means on said base plate affording a first shaft supporting a first feed wheel and a second shaft supporting a second feed wheel, means driven in timed relation to said platen roller to impart corresponding indexing movements to said shafts, a conditioning unit normally driven in timed relation to said platen roller for withdrawing a master strip from said supply reel and feeding the same to said first feed wheel, means defining spaced-apart slots extending parallel to the said table top for supporting and guiding such strip across the printing station and operable to raise and lower the strip at said printing station in timed relation to the movements of said impression member, said slot defining means being connected to and operated by said means for raising and lowering the impression member whereby the portion of the master strip at the printing station is raised and lowered accordingly as the impression member is raised and lowered.

10. In a printing machine for making printed impressions from a master strip bearing reproduceable images thereon, said machine embodying a frame having a table top, means mounted on said frame and affording an impression member in operative association with said table top to define a printing station, means to raise and lower the impression member during the impression cycles, a base plate connected to said table top at points located rearwardly of said printing station and arranged to support said impression member in upwardly spaced relationship with respect to said table top to define a forwardly opening throat between said plate and said table top into which sheet feed means may be inserted, means for feeding a master strip across said printing station and beneath said impression member and including a supply reel and a rewind reel mounted on said base plate, means on said base plate affording a first shaft supporting a first feed wheel and a second shaft supporting a second feed wheel, means driven in timed relation to said platen roller to impart corresponding indexing movements to said shafts, a conditioning unit driven in timed relation to said platen roller for withdrawing a master strip from said supply reel and feeding the same to said first feed wheel, means in said unit for conditioning the strip for printing, means defining spaced apart slots extending parallel to said table top for supporting and guiding such strip across the printing station, and means for driving said rewind reel after the feed wheels advance a new image to the printing station, and means for over-driving the conditioning means.

11. In a printing machine of the character described embodying a frame having a table top, a vertically shiftable impression mechanism mounted on said frame and affording a roller platen in operative association with said table top to afford a printing station, a base plate connected to said table top at points located rearwardly of said printing station and arranged to support said impression mechanism in upwardly spaced relationship with respect to said table top, means for feeding a master strip across said printing station and beneath said platen roller and including a supply reel and a rewind reel mounted on said base plate, means on said base plate for feeding such strip from said supply reel to said rewind reel and in a step-by-step manner past said printing station, said last mentioned means being driven in timed relation to the operations of said platen roller, a conditioning unit normally driven at a constant rate in timed relation to the operations of said platen roller for conditioning such a master strip before it reaches said printing station, means for supporting and guiding such strip across the printing station and operable to raise and lower the strip at said printing station in timed relation to the operations of said platen roller, the said operating and guiding means including spaced-apart slots for holding the portion of the master strip at the printing station and being connected to and operated by the said vertically shiftable impression mechanism whereby said portion of the master strip is raised and lowered to printing position accordingly as the roller platen is raised and lowered to printing position, and a lost motion arrangement associated with the feeding means to maintain said portion of the master strip taut while being lowered to printing position.

12. In a machine of the character described, means for feeding an elongated master strip past an impression station, means at said impression station for applying printing pressure to such a master, means for conditioning the master for a printing operation and including a feed means adapted to advance the master strip in a predetermined direction, and means for applying moisture to said master strip including a source of moisture and a moisture applying roll engaged with said master and driven in a direction counter to the direction of movement of the master strip by said feed means.

13. In a machine of the character described, means for feeding an elongated master strip past an impression station, means at said impression station for applying printing pressure to such a master, means for conditioning the master for a printing operation and including a feed means adapted to advance the master strip in a predetermined direction, and means for applying moisture to said master strip including a source of moisture and a moisture applying roll engaged with said master past which the master is drawn in said direction by said feed means, and means driving said moisture applying roll in a direction that opposes movement of the strip in said direction and applies moisture from such roll onto the strip with a wiping action.

14. In a machine of the character described, means for feeding an elongated master strip comprising a supply reel and a rewind reel between which the master strip is extended and a step-by-step advancing mechanism for feeding such strip past an impression station, an operating unit between said supply reel and said step-by-step mechanism for continuously withdrawing the strip from said supply reel and including a constantly driven feed roll, platen means at said impression station for applying intermittent printing pressure to such a master in timed relation to said step-by-step advancing mechanism, means included in said operating unit for conditioning the master for a printing operation prior to the master being fed to the platen means and including means for applying moisture to said master strip including a source of moisture and a moisture applying roll engaged with said master and driven in continuous timed relation to said feed roll in a direction counter to the direction of movement of the master strip.

15. In a feeding and conditioning unit for an elongated master printing strip comprising, means for feeding an elongated master strip, a supply reel and a rewind reel between which the master strip is extended and a step-by-step advancing mechanism for feeding such strip past an impression station, platen means at said impression station for applying intermittent printing pressures to said master in timed relation to said advancing mechanism, an operating unit between said supply reel and said step-by-step mechanism for withdrawing the strip from said supply reel and including a constantly driven feed roll, tension-maintaining means for acting on such strip between said supply reel and said step-by-step mechanism, means included in said operating unit for conditioning the master for a printing operation and including means for applying moisture to said master strip including a source of moisture and a constantly driven moisture applying roll adapted for continuous engagement with said master and driven in a direction counter to the direction of movement of the master strip.

16. In a machine of the character described, means for feeding an elongated, image-bearing master strip comprising a supply reel and a rewind reel between which the master strip is extended and a step-by-step advancing mechanism for feeding such strip past an impression station, an operating unit between said supply reel and said step-by-step mechanism for withdrawing the strip from said supply reel and including a constantly driven feed roll having a molleton covered surface for engaging the image-bearing face of such a strip to feed the same, means at said impression station for applying printing pressure to such a master, means included in said operating unit for conditioning the master for a printing operation and including a source of moisture, a molleton covered roll and a second roll supplied with moisture from said source and engaged with said master, and means driving said second roll in a direction counter to the direction of movement of the master strip and for driving said last mentioned molleton covered roll in a direction opposite to the direction of said second roll and at a surface speed greater than the surface speed of said driven feed roll.

17. In a feeding and conditioning unit for an elongated master printing strip, means for feeding an elongated master strip comprising a supply reel and a rewind reel between which the master strip is extended and a step-by-step advancing mechanism for feeding such strip past an impression station, intermittently operating platen means at said impression station effective to apply printing pressures to said master, an operating unit between said supply reel and said step-by-step mechanism for withdrawing the strip from said supply reel and including a constantly driven feed roll, tension-maintaining means for acting on such strip between said supply reel and said step-by-step mechanism, means included in said operating unit for conditioning the master for a printing operation and including means for applying moisture to said master strip including a source of moisture and a pair of moisture applying rolls supplied with moisture from said source and engaged with said master, and means driving said moisture applying rolls in opposite directions.

18. In a machine of the character described, feeding means for feeding a lithographic master through a conditioning station and then into an impression station, means at said impression station for applying printing pressure to such a master, means at said conditioning station for applying moisture to such a master during movement of the master in one direction and effective first to wipe the moisture into the master in a direction counter to said one direction and then to wipe the moisture into the master in said one direction, and moisture absorbing means forming part of said feeding means operable thereafter to engage said master with a blotting action.

19. In a printing machine of the character described, means including an anvil and a normally retracted platen associated therewith together defining a printing station, means for feeding sheets to be printed into and out of said printing station and over said anvil, means for feeding a master strip in a step by step manner through said printing station, a carriage for the platen adapted to carry the platen from said retracted position relative to the anvil to a printing position to press the master strip and the sheet to be printed against said anvil, a guide frame connected to said carriage and through which the master strip is adapted to pass so as to shift with the carriage between retracted and printing positions relative to the anvil, means for conditioning the master strip for making printed impressions onto said sheets when the platen roller is advanced from retracted to printing position, and means associated with the master strip feed means to maintain the master strip taut in the guide frame.

20. In a printing machine of the character described, means defining a printing station including a printing anvil and an impression member for cooperating therewith, said impression member being mounted in a carriage for movement between an elevated position where the impression member is retracted above the anvil and a lowered position where the impression member is adapted to bear against the anvil, means for feeding a sheet to be printed into printing position over the anvil and beneath the impression member, means for feeding an elongated master strip across the anvil to print said sheet in printing position, a frame on the carriage disposed beyond the impression member and through which the master strip may be threaded to be lowered with the carriage and the impression member toward the anvil to print said sheet, and means associated with the feed means for the master strip to maintain the same taut in said frame.

21. In a machine of the character described, means for feeding an elongated, image-bearing master strip past an impression station, means at said impression station for applying printing pressure to such a master, means for conditioning the master for a printing operation and including a feed means adapted to advance the master strip in a predetermined direction toward the impression station, a roller for applying moisture to said master strip at one time in advance of the impression station with a wiping action in said predetermined direction, another roller for applying moisture to said master strip at another time in advance of the impression station with a wiping action in the opposite direction to assure even and effective moisture distribution on such strip, and means to drive said rollers at a surface speed greater than that of said strip past the rollers.

22. In a machine of the character described, feeding means for feeding a lithographic master through a conditioning station and then into an impression station, means at said impression station for applying printing pressure to such a master, a roller at said conditioning station for engaging and applying moisture in one direction to such a master during movement of the master through the conditioning station, means to drive said roller at a greater surface speed than that of said master through the conditioning station, a second roller at said conditioning station effective to engage and apply moisture onto the master, and means to drive the second roller in a direction counter to that of the first-named roller and to drive the second roller at a speed greater than that of the master past the second roller.

23. In a machine of the character described, feeding means for feeding a lithographic master through a conditioning station and then into an impression station, means at said impression station for applying printing pressure to such a master, a pair of engaged rollers at said conditioning station arranged in tandem on one side of the master for applying moisture to such a master during movement of the master in one direction, and means to drive the one roller at a surface speed greater than that of the master through the conditioning station so that the one roller drives the other roller engaged therewith also at a surface speed greater than that of the master through the conditioning station, whereby the two rollers together rotate in opposite directions while engaging the master and wipe moisture into the master in opposite directions.

References Cited in the file of this patent

UNITED STATES PATENTS

| | | |
|---|---|---|
| 664,965 | Morriss | Jan. 1, 1901 |
| 769,296 | Bender | Sept. 6, 1904 |
| 1,084,513 | Wescott | Jan. 13, 1914 |
| 1,535,567 | Bornschein | Apr. 28, 1925 |
| 1,558,686 | Lipton | Oct. 27, 1925 |
| 1,958,593 | Shultz | May 15, 1934 |
| 2,046,189 | Shultz | June 30, 1936 |
| 2,277,514 | Elser | Mar. 24, 1942 |
| 2,282,737 | Mills | May 12, 1942 |
| 2,340,819 | Mills | Feb. 1, 1944 |
| 2,359,849 | Hueber | Oct. 10, 1944 |
| 2,421,824 | Allen et al. | June 10, 1947 |
| 2,503,185 | Wright | Apr. 4, 1950 |
| 2,548,281 | Bartholomew | Apr. 10, 1951 |